(12) United States Patent
Suh et al.

(10) Patent No.: US 7,366,090 B2
(45) Date of Patent: *Apr. 29, 2008

(54) APPARATUS AND METHOD FOR GENERATING A PREAMBLE SEQUENCE IN AN OFDM COMMUNICATION SYSTEM

(75) Inventors: Chang-Ho Suh, Seoul (KR);
Chan-Byoung Chae, Seoul (KR);
Ho-Kyu Choi, Seongnam-si (KR);
Jung-Min Ro, Suwon-si (KR);
Pan-Yuh Joo, Seoul (KR)

(73) Assignee: Samsung Electronics Co., Ltd (KR)

( * ) Notice: Subject to any disclaimer, the term of this patent is extended or adjusted under 35 U.S.C. 154(b) by 765 days.

This patent is subject to a terminal disclaimer.

(21) Appl. No.: 10/819,502

(22) Filed: Apr. 7, 2004

(65) Prior Publication Data
US 2004/0202103 A1 Oct. 14, 2004

(30) Foreign Application Priority Data
Apr. 8, 2003 (KR) .............. 10-2003-0022075

(51) Int. Cl.
*H04J 11/00* (2006.01)

(52) U.S. Cl. ............ 370/208; 370/210; 375/260; 375/367

(58) Field of Classification Search ........... 370/208, 370/209, 210, 276, 277, 320, 335, 491, 441, 370/509–515; 375/260, 367, 354, 299, 365
See application file for complete search history.

(56) References Cited

U.S. PATENT DOCUMENTS

2004/0109405 A1* 6/2004 Suh et al. ............... 370/208

* cited by examiner

*Primary Examiner*—Chi Pham
*Assistant Examiner*—Alexander O. Boakye
(74) *Attorney, Agent, or Firm*—The Farrell Law Firm, PC

(57) ABSTRACT

A method for generating a preamble sequence in an orthogonal frequency division multiplexing (OFDM) communication system having A subcarriers in a frequency domain. The method comprises generating a length-$2 \times M \times N$ preamble sequence, where $2 \times M \times N$ is less than A, by using a length-N Golay complementary sequence and a length-M Golay complementary sequence; and assigning elements constituting the preamble sequence to $2 \times M \times N$ subcarriers among the A subcarriers on a one-to-one mapping basis, assigning null data to the remaining subcarriers excluding the $2 \times M \times N$ subcarriers from the A subcarriers, and then IFFT-transforming the assigned result into time-domain data.

26 Claims, 15 Drawing Sheets

| CP | 64 | 64 | 64 | 64 | CP | 128 | 128 |

FIG.1
(PRIOR ART)

| CP | 128 | 128 |

FIG.2
(PRIOR ART)

APPARATUS AND METHOD FOR GENERATING A PREAMBLE SEQUENCE IN AN OFDM COMMUNICATION SYSTEM

PRIORITY

This application claims priority under 35 U.S.C. § 119 to an application entitled "Apparatus and Method for Generating Preamble Sequence in an OFDM Communication System" filed in the Korean Intellectual Property Office on Apr. 8, 2003 and assigned Serial No. 2003-22075, the contents of which are incorporated herein by reference.

BACKGROUND OF THE INVENTION

1. Field of the Invention

The present invention relates generally to an orthogonal frequency division multiplexing (OFDM) communication system, and in particular, to an apparatus and method for generating a preamble sequence using a Golay complementary sequence.

2. Description of the Related Art

In general, a wireless communication system supporting a wireless communication service is comprised of Node Bs and user equipments (UEs). The Node Bs and the UEs support a wireless communication service using transmission frames. Therefore, the Node Bs and the UEs must acquire mutual synchronization for transmission and reception of transmission frames, and for the synchronization acquisition, a Node B transmits a synchronization signal so that a UE can detect the start of a frame transmitted by the Node B. The UE then detects frame timing of the Node B by receiving the synchronization signal transmitted by the Node B, and demodulates received frames according to the detected frame timing. Commonly, a specific preamble sequence previously appointed by the Node B and the UE is used for the synchronization signal.

In addition, a preamble sequence having a low peak-to-average power ratio (PAPR) is used for the preamble sequence in an OFDM communication system, and a preamble created by concatenating a long preamble, which is necessary for performing coarse synchronization, to a short preamble, which is necessary for performing fine frequency synchronization, is used for the preamble transmitted from a Node B to a UE. Further, only the short preamble is used for the preamble transmitted from the UE to the Node B for acquiring fine frequency synchronization. The reason that the preamble sequence having a low PAPR must be used as a preamble sequence of the OFDM communication system will now be described herein below.

First, because the OFDM communication system, which is a multicarrier communication system, uses a plurality of carriers, i.e., a plurality of subcarriers, orthogonality between the subcarriers is important. Therefore, phases of the subcarriers are appropriately set so that orthogonality between the subcarriers should be secured, and if the phases are changed during signal transmission/reception through the subcarriers, signals on the subcarriers overlap each other. In this case, the amplitude of the signals that overlap due to the phase change deviates from a linear region of an amplifier included in the OFDM communication system, disabling normal signal transmission/reception. Therefore, the OFDM communication system uses a preamble sequence having a minimal PAPR.

Further, the OFDM communication system transmits data for several users, or UEs, by time-multiplexing one frame. In the OFDM communication system, a frame preamble indicating a start of a frame is transmitted for a predetermined period beginning at a start point of the frame. Because data may be irregularly transmitted to the respective UEs within one frame, a burst preamble indicating the start of data exists at a front part of each data block. Therefore, a UE must receive a data frame in order to identify a transmission start point of the data. The UE should be synchronized to a start point of data in order to receive the data, and to this end, the UE must acquire a preamble sequence used commonly by all systems for synchronization before receiving signals.

The OFDM communication system is identical to a non-OFDM communication system in a source coding scheme, a channel coding scheme, and a modulation scheme. While a code division multiple access (CDMA) communication system spreads data before transmission, the OFDM communication system performs inverse fast Fourier transform (IFFT) on data and inserts a guard interval in the IFFT-transformed data before transmission. Therefore, compared with the CDMA communication system, the OFDM communication system can transmit a wideband signal using relatively simple hardware. In the OFDM communication system, if a parallel bit/symbol stream generated by parallel converting a plurality of serial bit/symbol streams is applied as a frequency-domain IFFT input after modulation is performed on data, an IFFT-transformed time-domain signal is output. The time-domain output signal is obtained by multiplexing a wideband signal with several narrowband subcarrier signals, and a plurality of modulation symbols are transmitted for a one-OFDM symbol period through the IFFT process.

However, in the OFDM communication system, if the IFFT-transformed OFDM symbol is transmitted as it is, interference between a previous OFDM symbol and a current OFDM symbol is unavoidable. In order to remove the inter-symbol interference, the guard interval is inserted. The guard interval is so proposed as to insert null data for a predetermined period. However, in a method of transmitting null data for the guard interval, if a receiver incorrectly estimates a start point of an OFDM symbol, interference occurs between subcarriers, causing an increase in error probability of a received OFDM symbol. Therefore, a "cyclic prefix" scheme or a "cyclic postfix" scheme has been proposed for the guard interval. In the cyclic postfix scheme, a predetermined number of last bits in a time-domain OFDM symbol are copied and then inserted in an effective OFDM symbol, and in the cyclic prefix scheme, a predetermined number of first bits in a time-domain OFDM symbol are copied and then inserted in an effective OFDM symbol. The bits used in the cyclic prefix scheme and the cyclic postfix scheme are preset bits, and in the OFDM communication system, a length of the preset bits is previously determined. A receiver may acquire time/frequency synchronization of a received OFDM symbol using a characteristic of the guard interval created by copying a part of one time-domain OFDM symbol, i.e., a beginning part or a last part of one OFDM symbol, and then repeatedly arranging the copied OFDM symbols.

In any radio frequency (RF) system, a transmission signal transmitted by a transmitter is distorted while it passes through a radio channel, and thus, a receiver receives a distorted transmission signal. The receiver acquires time/frequency synchronization of the received distorted transmission signal, using a preamble sequence previously set between the transmitter and the receiver, performs channel estimation, and then demodulates the channel-estimated signal into frequency-domain symbols through fast Fourier transform (FFT). After demodulating the channel-estimated signal into frequency-domain symbols, the receiver performs channel decoding and source decoding corresponding to the channel coding applied in the transmitter on the demodulated symbols, to thereby decode the demodulated symbols into information data.

The OFDM communication system uses a preamble sequence for frame timing synchronization, frequency synchronization, and channel estimation. The OFDM communication system may perform frame timing synchronization, frequency synchronization, and channel estimation using a guard interval and a pilot subcarrier in addition to the preamble. The preamble sequence is used to transmit known symbols at a beginning part of every frame or data burst, and update estimated time/frequency/channel information at a data transmission part, using information on the guard interval and the pilot subcarrier.

FIG. 1 is a diagram illustrating a structure of a long preamble sequence for a conventional OFDM communication system. It should be noted that a current OFDM communication system uses the same preamble sequence in both a downlink (DL) and an uplink (UP). Referring to FIG. 1, in the long preamble sequence, a length-64 sequence is repeated 4 times and a length-128 sequence is repeated 2 times, and according to a characteristic of the OFDM communication system, the above-stated cyclic prefix (CP) is added to a front end of the 4 repeated length-64 sequences and to a front end of the 2 repeated length-128 IFFT are frequency-domain signals, and signals obtained after performing IFFT are time-domain signals. The long preamble sequence illustrated in FIG. 1 represents a time-domain long preamble sequence obtained after performing IFFT.

Frequency-domain long preamble sequences obtained before performing IFFT are illustrated below.

$S(-100:100) = \{+1 + j, 0, 0, 0, +1 + j, 0, 0, 0, +1 + j, 0, 0, 0,$ $+1 - j, 0, 0, 0, -1 + j, 0, 0, 0, +1 + j, 0, 0, 0, +1 + j, 0, 0, 0,$ $+1 + j, 0, 0, 0, +1 - j, 0, 0, 0, -1 + j, 0, 0, 0,$ $+1 + j, 0, 0, 0, +1 + j, 0, 0, 0, +1 + j, 0, 0, 0, +1 - j, 0, 0, 0,$ $-1 + j, 0, 0, 0, +1 - j, 0, 0, 0, +1 - j, 0, 0, 0,$ $+1 - j, 0, 0, 0, -1 - j, 0, 0, 0, +1 + j, 0, 0, 0, -1 + j, 0, 0, 0,$ $-1 + j, 0, 0, 0, -1 + j, 0, 0, 0, +1 + j, 0, 0, 0, -j - j, 0, 0, 0,$ $0, 0, 0, 0,$ $-1 - j, 0, 0, 0, +1 - j, 0, 0, 0, +1 + j, 0, 0, 0,$ $-1 - j, 0, 0, 0, -1 + j, 0, 0, 0, +1 - j, 0, 0, 0, +1 + j, 0, 0, 0,$ $-1 + j, 0, 0, 0, +1 - j, 0, 0, 0, -1 - j, 0, 0, 0,$ $+1 + j, 0, 0, 0, -1 + j, 0, 0, 0, -1 - j, 0, 0, 0, +1 + j, 0, 0, 0,$ $+1 - j, 0, 0, 0, -1 - j, 0, 0, 0, +1 - j, 0, 0, 0,$ $+1 + j, 0, 0, 0, -1 - j, 0, 0, 0, -1 + j, 0, 0, 0, -1 + j, 0, 0, 0,$ $-1 - j, 0, 0, 0, +1 - j, 0, 0, 0, -1 + j, 0, 0, 0,$ $+1 + j\} * \text{sqrt}(2) * \text{sqrt}(2)$ -continued $P(-100:100) = \{-1, 0, +1, 0, +1, 0, +1, 0, +1, 0, -1, 0, -1,$ $0, +1, 0, -1, 0, +1, 0,$ $-1, 0, -1, 0, +1, 0, +1, 0, -1, 0, +1, 0, -1,$ $0, +1, 0, -1, 0, +1, 0,$ $-1, 0, +1, 0, +1, 0, -1, 0, +1, 0, -1, 0, -1,$ $0, +1, 0, -1, 0, -1, 0,$ $-1, 0, +1, 0, +1, 0, -1, 0, +1, 0, +1, 0, +1,$ $0, -1, 0, +1, 0, +1, 0,$ $-1, 0, -1, 0, -1, 0, +1, 0, +1, 0, +1, 0, +1,$ $0, +1, 0, +1, 0, +1, 0,$ $0, 0,$ $-1, 0, -1, 0, +1, 0, -1, 0, -1, 0, +1, 0, +1,$ $0, +1, 0, -1, 0, +1, 0,$ $+1, 0, +1, 0, -1, 0, -1, 0, -1, 0, -1, 0, -1,$ $0, -1, 0, +1, 0, -1, 0,$ $-1, 0, -1, 0, -1, 0, -1, 0, -1, 0, +1, 0, +1,$ $0, +1, 0, -1, 0, +1, 0,$ $-1, 0, +1, 0, +1, 0, -1, 0, +1, 0, +1, 0, +1,$ $0, -1, 0, -1, 0, -1, 0,$ $-1, 0, -1, 0, +1, 0, -1, 0, -1, 0, +1, 0, -1,$ $0, -1, 0, +1, 0, -1\}$ $* \text{sqrt}(2) * \text{sqrt}(2)$ Numerals specified in the frequency-domain long frequency sequences S(−100:100) and P(−100:100) represent subcarriers' positions applied while IFFT is performed, and a detailed description thereof will be made with reference to FIG. 3. S(−100:100) represents a frequency-domain preamble sequence obtained by repeating a length-64 sequence 4 times, and P(−100:100) represents a frequency-domain preamble sequence obtained by repeating a length-128 sequence 2 times. In the expression of S(−100:100) and P(−100:100), 'sqrt(2)' means 'root 2', and 'sqrt(2)*sqrt(2)' means performing double amplification to increase transmission power of S(−100:100) and P(−100:100).

FIG. 2 is a diagram illustrating a structure of a short preamble sequence for a conventional OFDM communication system. Referring to FIG. 2, in the short preamble sequence, a length-128 sequence is repeated 2 times, and according to a characteristic of the OFDM communication system, the above-stated cyclic prefix (CP) is added to a front end of the 2 repeated length-128 sequences. In addition, the short preamble sequence illustrated in FIG. 2 represents a time-domain short preamble sequence obtained after performing IFFT, and a frequency-domain short preamble sequence equals the above-stated P(−100:100).

The long preamble sequence stated above must be generated taking the following conditions into consideration.

(1) The long preamble sequence should have a low PAPR.

In order to maximize transmission efficiency of a power amplifier (PA) in a transmitter of an OFDM communication system, a PAPR of an OFDM symbol must be low. That is, because an IFFT-transformed signal is applied to a power amplifier and because of a non-linear characteristic of the power amplifier, a low PAPR is required. A PAPR of an OFDM symbol must be low in a ratio of maximum power to average power of a time-domain OFDM symbol corresponding to an IFFT output terminal of the transmitter, and for a low ratio of the maximum power to the average power, uniform distribution must be provided. In other words, a PAPR of an output becomes low if symbols having a low cross correlation are combined in an IFFT processor's input terminal of the transmitter, i.e., in a frequency domain.

(2) The long preamble sequence should be suitable for parameter estimation needed for communication initialization.

The parameter estimation includes channel estimation, frequency offset estimation, and time offset estimation.

(3) The long preamble sequence should have low complexity and low overhead.

(4) Coarse frequency offset estimation should be possible.

A function of the long preamble sequences generated considering the foregoing conditions will now be described herein below.

(1) A sequence obtained by repeating a length-64 sequence 4 times is used for time offset estimation and coarse frequency offset estimation.

(2) A sequence obtained by repeating a length-128 sequence 2 times is used for fine frequency offset estimation.

As a result, the long preamble sequence has the following uses in the OFDM communication system.

(1) The long preamble sequence is used as a first preamble sequence of a downlink protocol data unit (PDU).

(2) The long preamble sequence is used for initial ranging.

(3) The long preamble sequence is used for bandwidth request ranging.

Further, the short preamble sequence has the following uses in the OFDM communication system.

(1) The short preamble sequence is used as an uplink data preamble sequence.

(2) The short preamble sequence is used for periodic ranging.

In the OFDM communication system, because accurate synchronization can be acquired by performing initial ranging and periodic ranging, the uplink preamble sequence is mainly used for channel estimation. For channel estimation, PAPR, performance and complexity should be taken into consideration. In the case of the existing short preamble sequence, a PAPR shows 3.5805[dB], and various channel estimation algorithms such as a minimum mean square error (MMSE) algorithm and a least square (LS) algorithm are used.

FIG. 3 is a diagram illustrating a mapping relation between subcarriers and a preamble sequence during IFFT processing in an OFDM communication system. It is assumed in FIG. 3 that if the number of all of the subcarriers for an OFDM communication system is 256, the 256 subcarriers include $-128^{th}$ to $127^{th}$ subcarriers, and if the number of subcarriers actually in use is 200, the 200 subcarriers include $-100^{th}$, . . . ,$-1^{st}$,$1^{st}$, . . . , $100^{th}$ subcarriers. In FIG. 3, input numerals at an IFFT processor's front end represent frequency components, i.e., unique numbers of subcarriers. Here, of the 256 subcarriers, only 200 subcarriers are used. That is, only 200 subcarriers excluding a $0^{th}$ subcarrier, the $-128^{th}$ to $-101^{st}$ subcarriers, and the $101^{st}$ to $127^{th}$ subcarriers from the 256 subcarriers are used. Null data, or 0-data, is inserted in each of the $0^{th}$ subcarrier, $-128^{th}$ to $-101^{st}$ subcarriers and $101^{st}$ to $127^{th}$ subcarriers, before being transmitted.

One reason for inserting null data into the $0^{th}$ subcarrier is because the $0^{th}$ subcarrier, after performing IFFT, represents a reference point of a preamble sequence in a time domain, i.e., represents a DC (Direct Current) component in a time domain. In addition, another reason for inserting null data into 28 subcarriers of the $-128^{th}$ to $-101^{st}$ subcarriers and 27 subcarriers of the $101^{st}$ to $127^{th}$ subcarriers is to provide a guard interval in a frequency domain because the 28 subcarriers of the $-128^{th}$ to $-101^{st}$ subcarriers and the 27 subcarriers of the $101^{st}$ to $127^{th}$ subcarriers correspond to a high frequency band in the frequency domain.

As a result, if a frequency-domain preamble sequence of S(−100:100) or P(−100:100) is applied to an IFFT processor, the IFFT processor maps the frequency-domain preamble sequence of S(−100:100) or P(−100:100) to corresponding subcarriers, IFFT-transforms the mapped preamble sequence, and outputs a time-domain preamble sequence.

FIG. 4 is a block diagram illustrating a structure of a transmitter in a conventional OFDM communication system. Referring to FIG. 4, if information bits to be transmitted are generated, the information bits are applied to a symbol mapper 411. The symbol mapper 411 symbol-maps the input information bits by a preset modulation scheme, and then provides the symbol-mapped bits to a serial-to-parallel (S/P) converter 413. Here, quadrature phase shift keying (QPSK) or 16-ary quadrature amplitude modulation (16QAM) can be used for the modulation scheme. The serial-to-parallel converter 413 parallel-converts symbols received from the symbol mapper 411 so that the number of the received symbols is matched to an A-point which is the number of inputs of an inverse fast Fourier transformer (IFFT processor) 419, and then provides the parallel-converted symbols to a selector 417. A preamble sequence generator 415, under the control of a controller (not shown), generates a corresponding preamble sequence and provides the generated preamble sequence to the selector 417. The selector 417 selects a signal output from the serial-to-parallel converter 413 or a signal output from the preamble sequence generator 415 according to scheduling at a corresponding time, and provides the selected signal to the IFFT processor 419.

The IFFT processor 419 performs A-point IFFT on a signal output from the selector 417, and provides its output to a parallel-to-serial (P/S) converter 421. In addition to the signal output from the IFFT processor 419, a cyclic prefix with a length L is applied to the parallel-to-serial converter 421. The parallel-to-serial converter 421 serial-converts the signal output from the IFFT processor 419 and the cyclic prefix, and provides its output to a digital-to-analog (D/A) converter 423. The digital-to-analog converter 423 analog-converts a signal output from the parallel-to-serial converter 421, and provides the analog-converted signal to a radio frequency (RF) processor 425. The RF processor 425 includes a filter and a front-end unit, and RF-processes a signal output from the digital-to-analog converter 423 so that it can be transmitted over the air, and then transmits the RF signal via an antenna.

A description will be made herein below of some of the disadvantages of a preamble sequence used in a conventional OFDM communication system, and a method for generating the preamble sequence.

(1) In the case of a short preamble sequence used in the existing OFDM communication system, a PAPR is 3.5805 [dB], which is a relatively large value higher than 3 [dB].

As described above, a preamble sequence improves the OFDM communication system when its PAPR is low. Generally, in data transmission, the value of 3.5805 [dB] can be regarded as a relatively small figure that does not affect performance of the OFDM communication system. However, when a preamble sequence used in estimating an initial parameter in the OFDM communication system is taken into consideration, the value of 3.5805 [dB] can become a figure that causes performance deterioration of the OFDM communication system. That is, the preamble sequence must be designed so that its PAPR has a value below 3 [dB] for initial parameter estimation of the OFDM communication system. However, when a short preamble sequence is used in the existing OFDM communication system, with a PAPR of 3.5805 [dB], a value higher than 3 [dB], this causes performance deterioration of the OFDM communication system.

(2) In the existing OFDM communication system, a full search method must be used in order to acquire a preamble sequence having a minimal PAPR. However, the full search method has an undesirably long processing time.

Assuming that in the OFDM communication system, a length of a preamble sequence is X and the number of types of values that elements of the preamble sequence can have is Y, if the full search is performed in order to acquire a preamble sequence having the minimum PAPR, the search must be performed $Y^X$ times. For example, if Y=2 and X=100, the search must be performed $2^{100}$ times in order to acquire a preamble sequence having the minimal PAPR. However, the number of $2^{100}$ operations is a very large number, and is a huge load on the OFDM communication system.

In order to solve such problems, there are demands for a preamble sequence having a minimum PAPR, i.e., a PAPR below 3 [dB] at the maximum, and a method for generating a preamble sequence having the minimum PAPR with a minimized number of operations within a short time.

SUMMARY OF THE INVENTION

It is, therefore, an object of the present invention to provide an apparatus and method for generating a preamble sequence in an OFDM communication system.

It is another object of the present invention to provide an apparatus and method for generating a preamble sequence having a minimum PAPR in an OFDM communication system.

It is further another object of the present invention to provide an apparatus and method for generating a preamble sequence adapted to minimize the number of operations in an OFDM communication system.

It is still another object of the present invention to provide an apparatus and method for generating a preamble sequence using a Golay complementary sequence in an OFDM communication system.

To achieve the above and other objects, there is provided an apparatus for generating a preamble sequence in an orthogonal frequency division multiplexing (OFDM) communication system having A subcarriers in a frequency domain. The apparatus comprises a preamble sequence generator for generating a length-2×M×N preamble sequence, where 2×M×N is less than A, by using a length-N Golay complementary sequence and a length-M Golay complementary sequence; and an inverse fast Fourier transform (IFFT) processor for assigning elements constituting the preamble sequence to 2×M×N subcarriers among the A subcarriers on a one-to-one mapping basis, assigning null data to the remaining subcarriers excluding the 2×M×N subcarriers from the A subcarriers, and then IFFT-transforming the assigned result into time-domain data.

Additionally, to achieve the above and other objects, there is provided a method for generating a preamble sequence in an orthogonal frequency division multiplexing (OFDM) communication system having A subcarriers in a frequency domain. The method comprises generating a length-2×M×N preamble sequence, where 2×M×N is less than A, by using a length-N Golay complementary sequence and a length-M Golay complementary sequence; and assigning elements constituting the preamble sequence to 2×M×N subcarriers among the A subcarriers on a one-to-one mapping basis, assigning null data to the remaining subcarriers excluding the 2×M×N subcarriers from the A subcarriers, and then IFFT-transforming the assigned result into time-domain data.

BRIEF DESCRIPTION OF THE DRAWINGS

The above and other objects, features, and advantages of the present invention will become more apparent from the following detailed description when taken in conjunction with the accompanying drawings in which:

FIG. 1 is a diagram illustrating a structure of a long preamble sequence for a conventional OFDM communication system;

FIG. 2 is a diagram illustrating a structure of a short preamble sequence for a conventional OFDM communication system;

DETAILED DESCRIPTION OF THE PREFERRED EMBODIMENT

Figure 3:
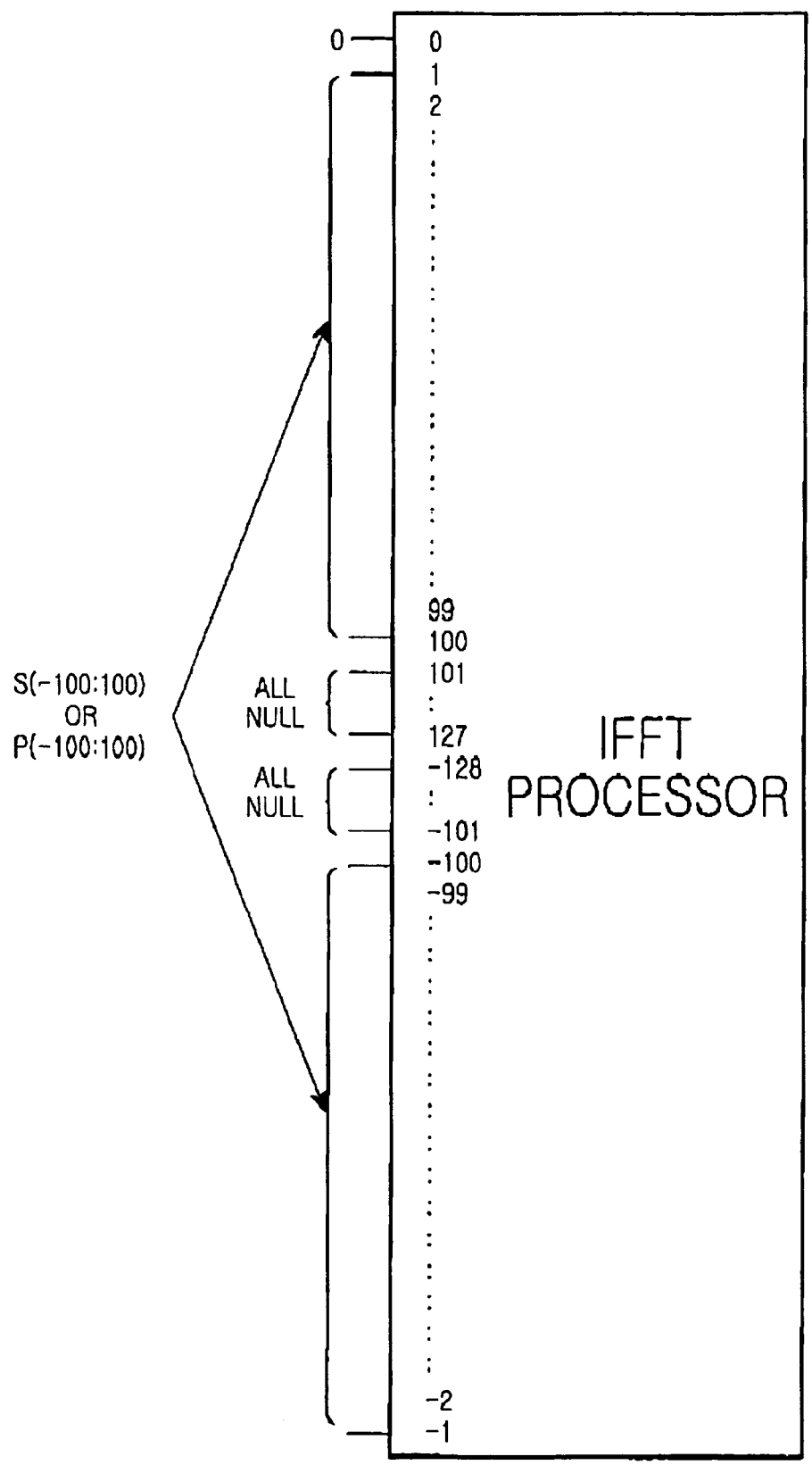
FIG. 3 is a diagram illustrating a mapping relation between subcarriers and a preamble sequence during IFFT processing in a conventional OFDM communication system.
Figure 4:
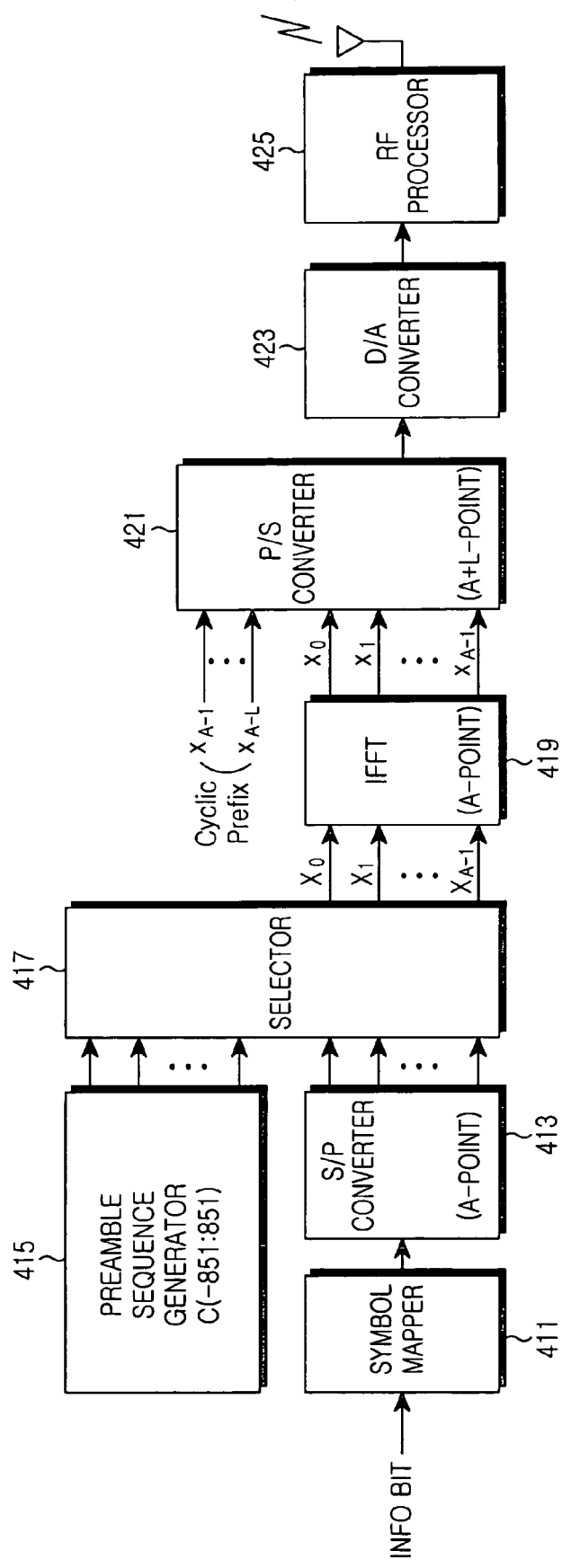
FIG. 4 is a block diagram illustrating a structure of a transmitter in an OFDM communication system.

Several preferred embodiments of the present invention will now be described in detail herein below with reference to the annexed drawings. In the following description, a detailed description of known functions and configurations incorporated herein has been omitted for conciseness.

The present invention provides an apparatus and method for generating a preamble sequence having a minimum peak-to-average power ratio (PAPR) in an orthogonal frequency division multiplexing (OFDM) communication system in which the number of all of subcarriers is A and unique numbers of subcarriers actually in use are $-B, -B+1, \ldots, -1, 1, \ldots, B-1, B$. In the OFDM communication system, although the number of actual subcarriers is A, the number of subcarriers into which a preamble sequence is actually inserted becomes 2B, because null data, or 0-data, is inserted in a $0^{th}$ subcarrier indicating a DC component in a time domain and subcarriers ($-A^{th}$ to $(-B-1)^{th}$ subcarriers and $(B+1)^{th}$ to $(A-1)^{th}$ subcarriers) indicating a high frequency band in a frequency domain, i.e., a guard interval in a time domain, as described in the related art section. In addition, a preamble sequence proposed in the present invention has a PAPR less than 3 [dB] at the maximum, and is generated using a Golay complementary sequence.

As described above, the preamble sequence is classified into a long preamble sequence and a short preamble sequence. In the long preamble sequence, a length-A/4 sequence is repeated 4 times and a length-A/2 sequence is repeated 2 times, and in the light of a characteristic of the OFDM communication system, a cyclic prefix (CP) is added to a front end of the 4 repeated length-A/4 sequences and a front end of the 2 repeated length-A/2 sequences. Here, A represents the number of points, or inputs, of inverse fast Fourier transform (IFFT) which will be described below. For example, if it is assumed that the IFFT has 256 points, in the long preamble sequence, a length-256/4=64 sequence is repeated 4 times and a length-256/2=128 sequence is repeated 2 times. Further, in the short preamble sequence, a length-A/2 sequence is repeated 2 times, and according to a characteristic of the OFDM communication system, the cyclic prefix (CP) is added to a front end of the 2 repeated length-A/2 sequences as described in the related art section.

In an OFDM communication system in which information symbols are transmitted after being IFFT-transformed, if a Golay complementary sequence is applied to all input terminals, i.e., all subcarriers, before performing the IFFT, then the information symbols after performing the IFFT have a PAPR below 3 [dB] according to a characteristic of the Golay complementary sequence. Here, the Golay complementary sequence represents a sequence in which the sum of an aperiodic autocorrelation function for all intervals of a particular sequence and an aperiodic autocorrelation function for the same interval of a complementary sequence becomes 0. That is, the Golay complementary sequence can be expressed as follows:

$$C_A(u) = \sum_{k=0}^{n-1-u} A_k A_{k+u}^*, \text{ (where } u = 1, 2, \ldots, n-2\text{)}$$

$$C_B(u) = \sum_{k=0}^{n-1-u} B_k B_{k+u}^*, \text{ (where } u = 1, 2, \ldots, n-2\text{)}$$

$$C_A(u) + C_B(u) = 0$$

$C_A(u)$ and $C_B(u)$ satisfying the above condition become a Golay complementary sequence pair.

For example, if an IFFT processor is a 512-point IFFT processor, a length-512 Golay complementary sequence is applied to an input terminal of the IFFT processor, and elements constituting the length-512 Golay complementary sequence are applied in association with 512 corresponding points of the IFFT processor. That is, IFFT is performed in such a manner that 512 subcarriers of $-256^{th}$ subcarrier to $255^{th}$ subcarrier are mapped to 512 elements constituting the Golay complementary sequence on a one-to-one basis.

However, in an actual OFDM communication system, null data must be inserted in a subcarrier corresponding to a DC component, i.e., $0^{th}$ subcarrier, and subcarriers corresponding to a guard interval component. Therefore, it is impossible to insert respective elements constituting the Golay complementary sequence into all subcarriers on the IFFT processor's input terminal on a one-to-one mapping basis. Because it is impossible to insert the Golay complementary sequence into the IFFT processor's input terminal on a one-to-one basis, the present invention proposes a rule for inserting the Golay complementary sequence into the IFFT processor's input terminal by mapping, thereby making the best use of a characteristic of the OFDM communication system.

1. Golay Complementary Sequence Mapping Rule

If respective elements constituting the Golay complementary sequence are inserted into specific subcarriers on an IFFT processor's input terminal to maintain a specific interval between the respective elements of the Golay complementary sequence and then null data is inserted in the remaining subcarriers into which the elements constituting the Golay complementary sequence are not inserted, their outputs after performing IFFT have a PAPR less than 3 [dB]. For example, if a specific interval at which Golay complementary sequence elements are inserted into the IFFT processor's input terminal is 1, it means that respective elements constituting the Golay complementary sequence are mapped to subcarriers on the IFFT processor's input terminal on a one-to-one basis and then sequentially inserted into the IFFT processor's input terminal. That is, if the specific interval is 1 when a length-512 Golay complementary sequence is inserted into a 512-point IFFT processor, 512 elements of the Golay complementary sequence are inserted into 512 subcarriers of the IFFT processor, respectively. However, in the OFDM communication system, null data should always be inserted into subcarriers corresponding to a DC component and a guard interval component in a high frequency band. Therefore, if a length of the Golay complementary sequence exceeds ½ of the number of the remaining subcarriers excluding the subcarriers corresponding to the DC component and the guard interval component from all the subcarriers, it is impossible to continuously insert respective elements constituting the Golay complementary sequence into the IFFT processor's input terminal.

As another example, if the specific interval is 2, there is provided a structure in which respective elements constituting the Golay complementary sequence are inserted into the subcarriers on the IFFT processor's input terminal every other subcarrier. In addition, null data is inserted into all of the remaining subcarriers into which elements of the Golay complementary sequence are not inserted. Here, if a subcarrier corresponding to a DC component exists in a position other than positions of the subcarriers in which the elements of the Golay complementary sequence are inserted, the Golay complementary sequence can be sequentially arranged on the IFFT processor's input terminal at regular intervals, and as a result, an output after performing the IFFT has a PAPR less than 3 [dB].

A description will now be made of a method of inserting elements constituting a short preamble sequence into positions of $-200^{th}$ to $200^{th}$ subcarriers on a 512-point IFFT processor's input terminal every other subcarrier. Because null data must be inserted into a DC component, i.e., a $0^{th}$ subcarrier on the IFFT processor's input terminal, it is impossible that data of +1 or −1, not null data, is inserted in the IFFT processor's input terminal at regular intervals. This is because elements of the short preamble sequence are actually mapped even to the $0^{th}$ subcarrier when elements of the short preamble sequence are inserted every other subcarrier, because a start position at which elements constituting the short preamble sequence are inserted is a $-200^{th}$ subcarrier. However, when elements constituting the short preamble sequence are inserted every another subcarrier beginning at a $-199^{th}$ subcarrier on the 512-point IFFT processor's input terminal, elements of the short preamble sequence are not mapped to the $0^{th}$ subcarrier. As a result, it is possible to insert all elements of the short preamble sequence into the IFFT processor's input terminal at regular intervals without mapping an element of the short preamble sequence to the $0^{th}$ subcarrier, so that a length-200 Golay complementary sequence is inserted into the 512-point IFFT processor's input terminal as follows:

[−199, −197, . . . , −3, −1, 1, 3, . . . ,197,199]

If null data is inserted in the remaining subcarriers other than the subcarriers identified by [−199, −197, . . . , −3, −1, 1, 3, . . . ,197,199], i.e., $0^{th}$ subcarrier, $-256^{th}$ to $-200^{th}$ subcarriers, and $200^{th}$ to $255^{th}$ subcarriers, then a PAPR after performing IFFT becomes less than 3 [dB].

The present invention generates a preamble sequence using the Golay Complementary Sequence Mapping Rule described above. In addition, the present invention proposes a method for generating a length-200 Golay complementary sequence capable of supporting the Golay Complementary Sequence Mapping Rule, and this will be described in detail later on. In the forgoing description, the Golay Complementary Sequence Mapping Rule has been described for a short preamble sequence with reference to a length-200 Golay complementary sequence. However, a preamble sequence used in the OFDM communication system can have a length other than the length 200.

Figure 7:
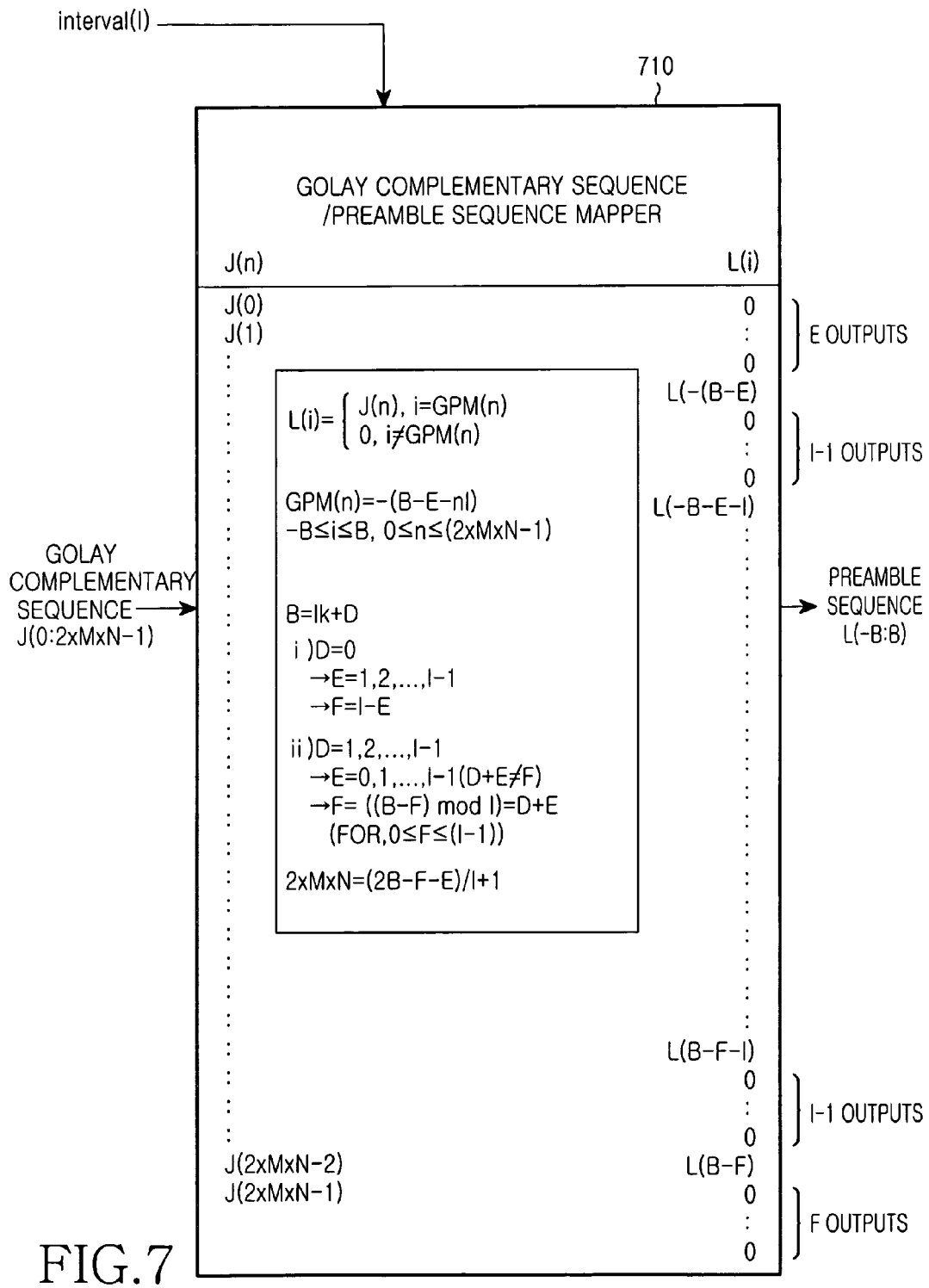
FIG. 7 is a diagram illustrating a rule for mapping a Golay complementary sequence to an IFFT processor's input terminal according to an embodiment of the present invention.

FIG. 7 is a diagram illustrating a rule for mapping a Golay complementary sequence to an IFFT processor's input terminal according to an embodiment of the present invention. It is assumed in FIG. 7 that in an OFDM communication system in which the number of subcarriers on an IFFT processor's input terminal is A, data is inserted into only the subcarriers identified by [−B, −(B−1), . . . , −1, 1, . . . , B−1, B], null data is inserted into the remaining subcarriers, and a specific interval at which a Golay complementary sequence is inserted is I (where I≧2).

In this case, B=Ik+D (where $0 \leq D \leq I-1$). Thus, constituent elements of the Golay complementary sequence are inserted in the subcarriers identified by [−(B−E), −(B−E−I), . . . , B−F−I, B−F] on the IFFT processor's input terminal, and null data is inserted in the other subcarriers. The parameters D, E, and F will be described herein below.

When the B is a multiple of I, i.e., when B=Ik, if subcarrier mapping of the IFFT processor's input terminal begins at a $-B^{th}$ subcarrier, a value of +1 or −1, not null data, should be necessarily inserted in a $0^{th}$ subcarrier. For B=Ik, because null data is inserted into the $0^{th}$ subcarrier, it is impossible to map the Golay complementary sequence to a preamble sequence. In order to prevent null data from being inserted into the $0^{th}$ subcarrier, B for determining a position on the IFFT processor's input terminal, at which insertion of respective elements of the Golay complementary sequence is started, is set to Ik+D. Here, if $0 \leq D \leq (I-1)$, all integers B can be included. In addition, a parameter E is defined in order to prevent a value of +1 or −1, not null data, from being mapped to the $0^{th}$ subcarrier. Moreover, a parameter F is defined in order to match a mapping relation for inserting the last part of the Golay complementary sequence.

If the Golay complementary sequence is represented by J and a preamble sequence output after performing IFFT on the Golay complementary sequence J is represented by L, then a Golay complementary sequence mapping rule is given by Equation (1).

$$L(i) = \begin{cases} J(n), & i = GPM(n) \\ 0, & i \neq GPM(n) \end{cases} \quad (1)$$

In Equation (1), GPM(n) is an index function, wherein n in GPM(n) represents an index of elements constituting a Golay complementary sequence and GPM(n) represents an index of elements constituting a preamble sequence. The GPM(n) is defined as $$GPM(n) = -(B-E-nI) \quad (2)$$

In Equation (2), $-B \leq i \leq B$, and $0 \leq n \leq (2 \times M \times N - 1)$. That is, the parameter i has a value of −B, −(B−1), . . . , −1, 1, . . . , B−1, B, and if there is n satisfying i=FPM(n), J(n) is inserted in a corresponding subcarrier on an input terminal of an IFFT processor. If there is no n satisfying i=GPM(n), null data is inserted into a corresponding subcarrier on the input terminal of the IFFT processor. A relation between the parameters D, E, and F will be described herein below, considering a situation where data of +1 or −1 should not be inserted into a $0^{th}$ subcarrier indicating a DC component and respective elements of the Golay complementary sequence are inserted into subcarriers on an IFFT processor's input terminal at regular intervals as described above.

(1) For D=0, the parameters are set so that E=1, 2, . . . , I−1 and F=I−E.

The reason for setting the parameters in this manner is because if D=E=0, data of +1 or −1, not null data, is inserted into the $0^{th}$ subcarrier on the IFFT processor's input terminal.

(2) For D=1, . . . , I−1, the parameters are set so that E= 0, . . . , I−1 (D+E≠F) and F=((B−F) mod I=D+E) (where $0 \leq F \leq I-1$).

The reason for setting the parameters in this way is to prevent data of +1 or −1, not null data, from being inserted into the $0^{th}$ subcarrier.

A description of FIG. 7 has been made for the case where in an A-point IFFT processor, subcarriers of −B, −(B−1), . . . , −1, 1, . . . , B−1, B are actually used, a length of a Golay complementary sequence is 2×M×N, and the Golay complementary sequence elements are mapped to the IFFT processor's input terminal at intervals of 1. An operation of actually mapping the Golay complementary sequence to the IFFT processor's input for mapping of a preamble sequence is performed by a Golay complementary sequence/preamble sequence mapper 710, and the connection between the Golay complementary sequence/preamble sequence mapper 710 and other hardware structures will be described herein below.

Next, with reference to FIG. 8, a description will be made as to the case where in a 512-point IFFT processor, 400 subcarriers of −200, −199, . . . , −1, 1, . . . , 199, 200 are actually used, a length of a Golay complementary sequence is 200, and the Golay complementary sequence elements are mapped to the IFFT processor's input terminal at intervals of 2.

Figure 8:
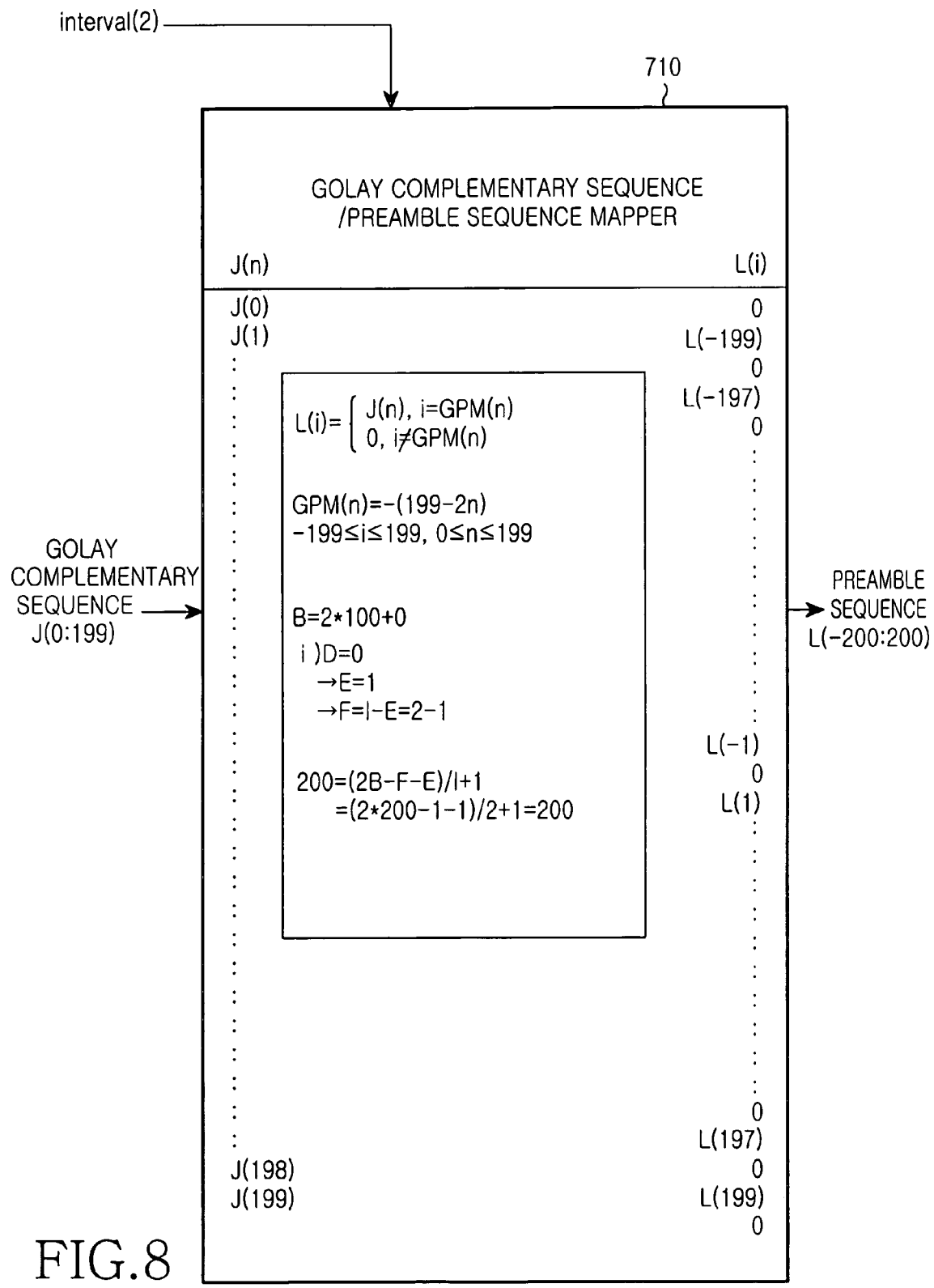
FIG. 8 is a diagram illustrating a rule for mapping a length-200 Golay complementary sequence to a 512-point IFFT processor's input terminal.

FIG. 8 is a diagram illustrating a rule for mapping a length-200 Golay complementary sequence to a 512-point IFFT processor's input terminal. It is assumed in FIG. 8 that in the Golay Complementary Sequence Mapping Rule described in FIG. 7, a point value A of the IFFT processor is 512, an integer B for determining a subcarrier position where mapping of the Golay complementary sequence is actually started is 200, and a specific interval I at which elements of the Golay complementary sequence are inserted is 2. In this case, D=0 by the Golay Complementary Sequence Mapping Rule described in FIG. 7, and because D=0, the parameters are set such that E=1 and F=I−E=2−1=1. Then, the index function GPM(n) becomes GPM(n)=−(199−2n) (where 0≦n≦199), so that elements of the length-200 Golay complementary sequence are mapped to subcarriers corresponding to [−199, −197, . . . , −1, 1, . . . , 197, 199] among the elements constituting a preamble sequence, i.e., subcarriers corresponding to [−199, −197, . . . , −1, 1, . . . , 197, 199] among 512 subcarriers on an IFFT processor's input terminal. Null data is inserted into the remaining subcarriers to which the Golay complementary sequence is not mapped.

Figure 6:
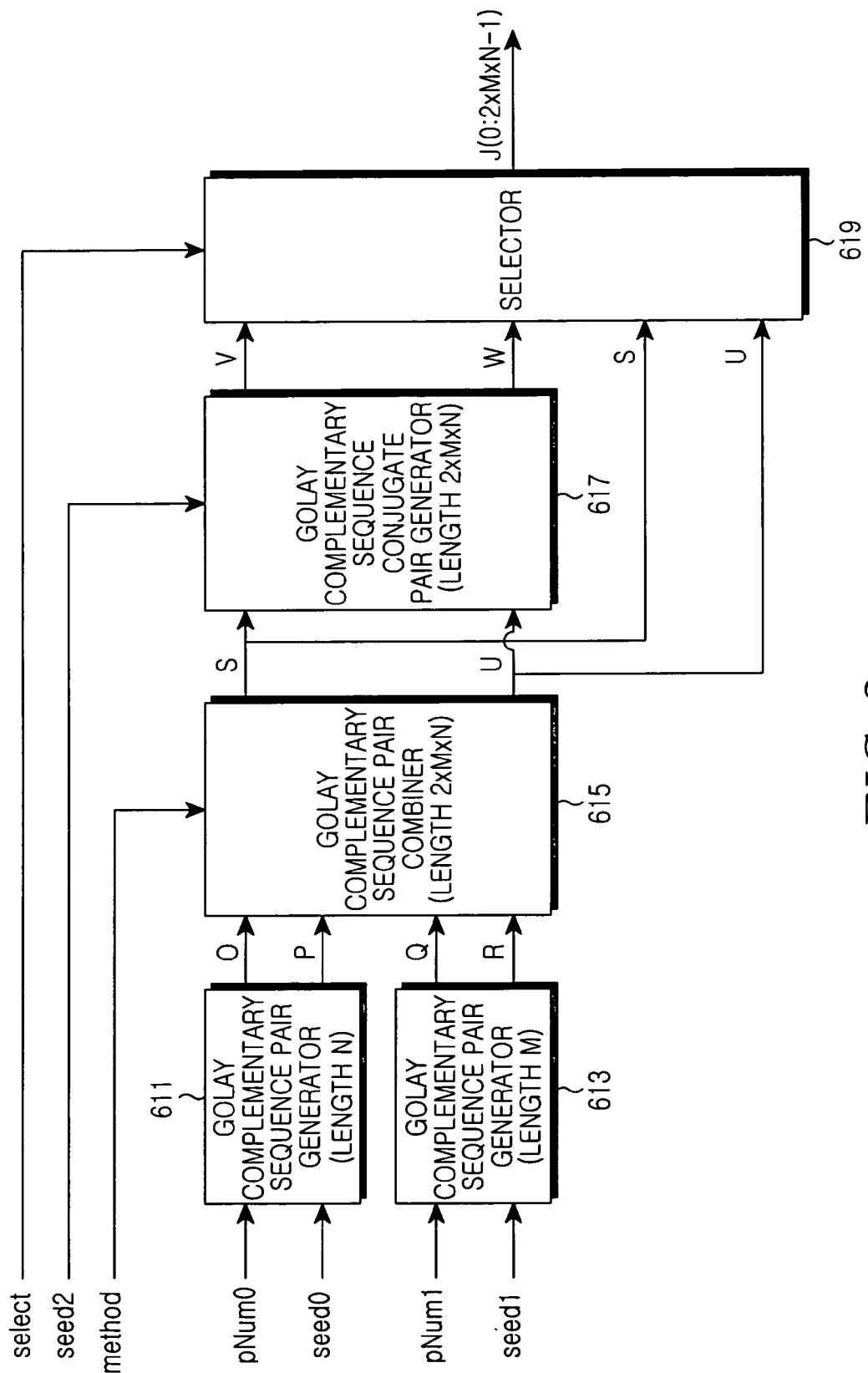
FIG. 6 is a block diagram illustrating a structure of a Golay complementary sequence generation apparatus according to an embodiment of the present invention.

FIG. 6 is a block diagram illustrating a structure of a Golay complementary sequence generation apparatus according to an embodiment of the present invention. FIG. 6 proposes a method for generating a length-2×M×N Golay complementary sequence. Here, M and N are integers satisfying a condition of $2^\alpha 10^\beta 26^\gamma$, where α, β, γ≧0.

Referring to FIG. 6, a Golay complementary sequence pair generator 611 is provided with a parameter pNum0 and a parameter seed0 from a controller (not shown), and generates a length-N Golay complementary sequence pair [O,P] according to the provided parameters pNum0 and seed0. The parameter pNum0 has an integer of 0 to K−1. The parameter K repr primitive Golay complementary sequence pairs. Therefore, the parameter pNum0 is a parameter for selecting a primitive Golay complementary sequence pair to be used among the K primitive Golay complementary sequence pairs, and the parameter seed0 has an integer of 0 to 63 and is a parameter for selecting a conjugate pair of the primitive Golay complementary sequence pair. The reason why the parameter seed0 has an integer of 0 to 63 is because a Golay complementary sequence pair has 64 conjugate pairs. The primitive Golay complementary sequence pair is a Golay complementary sequence pair that cannot be generated through combining of Golay complementary sequence pairs, which are shorter in length than the primitive Golay complementary sequence. A procedure for actually generating the Golay complementary sequence pair by the Golay complementary sequence pair generator 611 will be described in detail with reference to FIG. 9.

A Golay complementary sequence pair generator 613 is provided with a parameter pNum1 and a parameter seed1, and generates a length-M Golay complementary sequence pair [Q,R] according to the provided parameters pNum1 and seed1. The parameter pNum1 has an integer of 0 to Z−1. The parameter Z represents the number of length-M primitive Golay complementary sequence pairs. Therefore, the parameter pNum1 is a parameter for selecting a conjugate pair of a length-M primitive Golay complementary sequence pair.

A Golay complementary sequence pair combiner 615 combines the length-N Golay complementary sequence pair [O,P] generated from the Golay complementary sequence pair generator 611 with the length-M Golay complementary sequence pair [Q,R] generated from the Golay complementary sequence pair generator 613 according to a parameter 'method' indicating a Golay complementary sequence pair combining rule provided from the controller, and generates a length-2×M×N Golay complementary sequence pair [S,U]. The parameter 'method' indicating the Golay complementary sequence pair combing rule has an integer of 0 or 1, because there are 2 rules capable of combining the length-2×M×N Golay complementary sequence pair. The Golay complementary sequence pair combing rule will be described in detail herein below with reference to FIG. 11.

A Golay complementary sequence conjugate pair generator 617 is provided with a parameter seed2 from the controller, and generates a length-2×M×N Golay complementary sequence conjugate pair [VW] according to the provided parameter seed2. A procedure for generating the length-2×M×N Golay complementary sequence conjugate pair using the length-2×M×N Golay complementary sequence pair will be described in detail herein below with reference to FIG. 13.

Finally, a selector 619 is provided with a select signal from the controller, and selects the Golay complementary sequence pair [S,U] output from the Golay complementary sequence pair combiner 615 or the Golay complementary sequence conjugate pair [VW] output from the Golay complementary sequence conjugate pair generator 617 according to the provided select signal, and outputs a final length-2×M×N Golay complementary sequence J. The select signal has an integer of 0 to 3, and the selector 619 selects V for the select signal=0, W for the select signal=1, S for the select signal=2, and U for the select signal=3, and outputs the selected signal as the Golay complementary sequence J.

Figure 5:
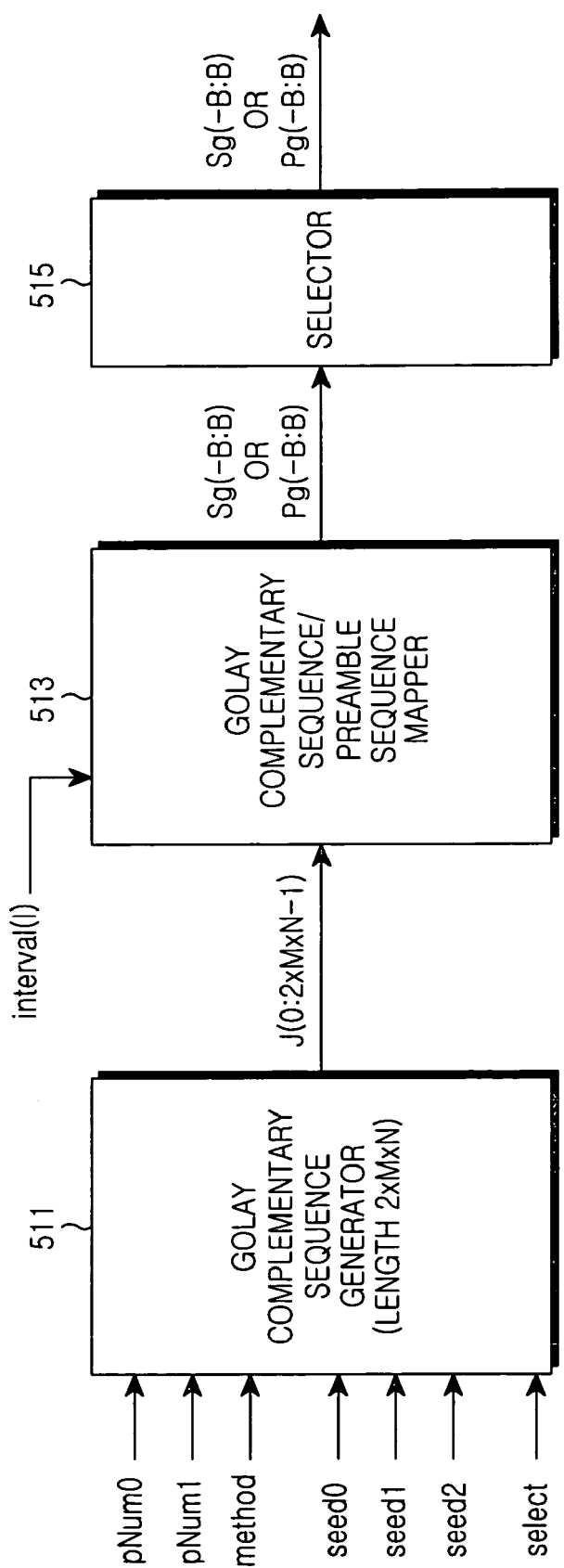
FIG. 5 is a block diagram illustrating a structure of a preamble sequence generator according to an embodiment of the present invention.

With reference to FIG. 5, a description will now be made of a procedure for actually generating a preamble sequence by mapping the length-2×M×N Golay complementary sequence according to the Golay complementary sequence mapping rule. Referring to FIG. 5, a preamble sequence generator is comprised of a Golay complementary sequence generator 511, a Golay complementary sequence/preamble sequence mapper 513, and a selector 515. The Golay complementary sequence generator 511 receives parameters pNum0, pNum1, seed0, seed1, seed2, and 'method' and a select signal, and generates a length-2 ×M×N Golay complementary sequence J(0:2×M×N−1) using the received parameters pNum0, pNum1, seed0, seed1, seed2, and 'method' and the received select signal. A procedure for generating a length 2×M×N Golay complementary sequence by the Golay complementary sequence generator 511 has already been described above with reference to FIG. 6, so a detailed description thereof will be omitted here.

The length-2×M×N Golay complementary sequence J(0: 2×M×N−1) generated from the Golay complementary sequence generator 511 is applied to the Golay complementary sequence/preamble sequence mapper 513, and the Golay complementary sequence/preamble sequence mapper 513 generates a preamble sequence corresponding to an IFFT processor's input by using the length-2×M×N Golay complementary sequence J(0:2×M×N−1) and a parameter 'interval(I)' provided from a controller. The parameter 'interval(I)' represents a specific interval at which a Golay complementary sequence is inserted in an input terminal of an IFFT processor to be used as a preamble sequence, and the Golay complementary sequence/preamble sequence mapper 513 generates a preamble sequence Sg(−B:B) for the interval(I)=4 and a preamble sequence Pg(−B:B) for the interval(I)=2. Here, Sg represents a sequence inserted in a leading preamble sequence of a long preamble sequence, Pg represents a sequence inserted in a short preamble sequence, and B represents the same value as B of FIG. 7.

Although FIG. 5 has been described on the assumption that the interval is set to 2 or 4, a value of the interval can be varied according to circumstances. Also, an operation of the Golay complementary sequence/preamble sequence mapper 513 has been described with reference to FIG. 7, so a detailed description thereof will be omitted. The Sg(−B:B) or Pg(−B:B) output from the Golay complementary sequence/preamble sequence mapper 513 is applied to the selector 515, and the selector 515 selects the Sg(−B:B) or the Pg(−B:B) as a preamble sequence according to circumstances.

Figure 9:
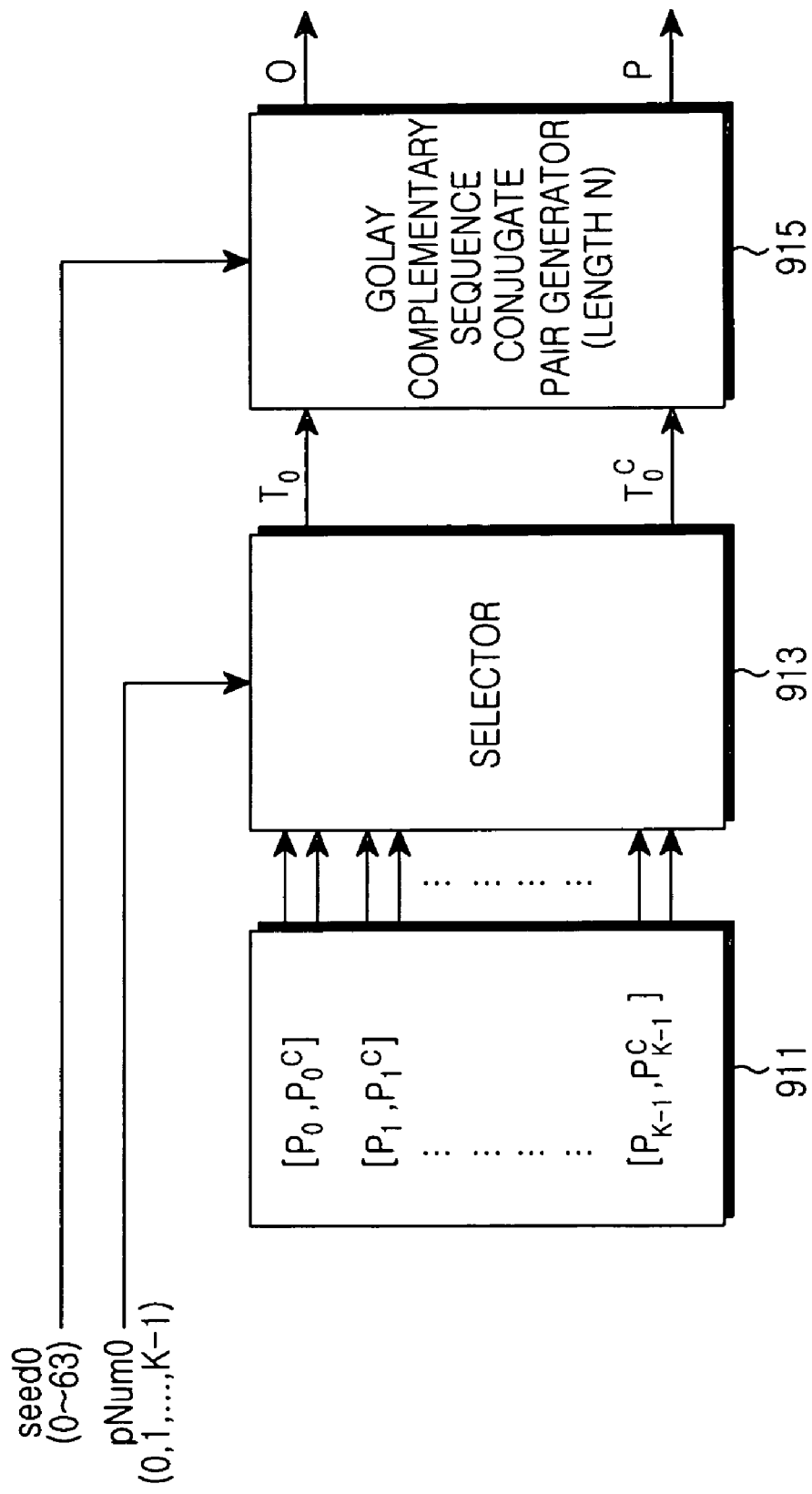
FIG. 9 is a block diagram illustrating a structure of the Golay complementary sequence pair generator illustrated in FIG. 6.

FIG. 9 is a block diagram illustrating a structure of the Golay complementary sequence pair generator 611 illustrated in FIG. 6. Referring to FIG. 9, if it is assumed that the number of length-N primitive Golay complementary sequence pairs 911 is K, a parameter pNum0 has an integer of 0 to K−1. The parameter pNum0 is applied to a selector 913, and the selector 913 selects a length-N primitive Golay complementary sequence pair $[T_0, T_0^C]$ among the length-N primitive Golay complementary sequence pairs 911, using the parameter pNum0, and provides the selected length-N primitive Golay complementary sequence pair $[T_0, T_0^C]$ to a Golay complementary sequence conjugate pair generator 915. The Golay complementary sequence conjugate pair generator 915 generates a Golay complementary sequence conjugate pair [O,P] by receiving the length-N primitive Golay complementary sequence pair $[T_0, T_0^C]$ output from the selector 913 and a parameter seed0 provided from the controller.

Figure 10:
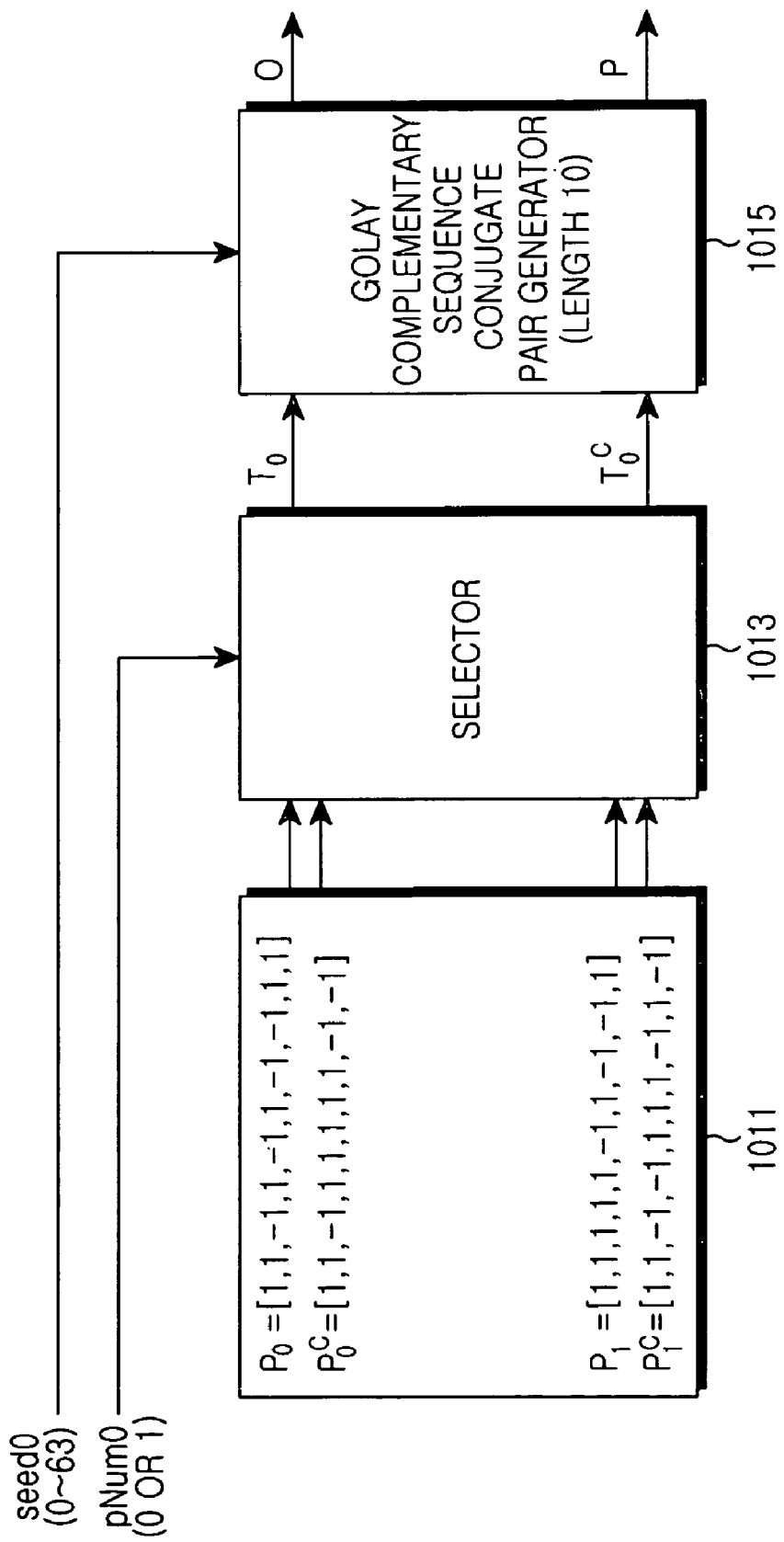
FIG. 10 is a block diagram illustrating a structure of a length-10 Golay complementary sequence pair generator.

FIG. 10 is a block diagram illustrating a structure of a length-10 Golay complementary sequence pair generator. Referring to FIG. 10, there are two length-10 primitive Golay complementary sequence pairs 1011, which are as follows:

$P_0$=[1, 1,−1, 1,−1, 1,−1,−1, 1]
$P_0^C$=[1, 1,−1, 1, 1, 1, 1, 1,−1,−1]
$P_1$=[1, 1, 1, 1, 1,−1, 1,−1,−1, 1]
$P_1^C$=[1, 1,−1,−1, 1, 1, 1,−1, 1,−1]

Because there are two length-10 primitive Golay complementary sequence pairs 1011, the parameter pNum0 for selecting a particular primitive Golay complementary sequence pair from the primitive Golay complementary sequence pairs has a value of 0 or 1, and a selector 1013 selects a length-10 primitive Golay complementary sequence pair using a value of the parameter pNum0 and outputs the selected sequence pair $[T_0, T_0^C]$. A Golay complementary sequence conjugate pair generator 1015 generates a Golay complementary sequence conjugate pair [O,P] using the sequence pair $[T_0, T_0^C]$ output from the selector 1013 and a parameter seed0 provided from the controller.

2. Golay Complementary Sequence Pair Combing Rule

Figure 11:
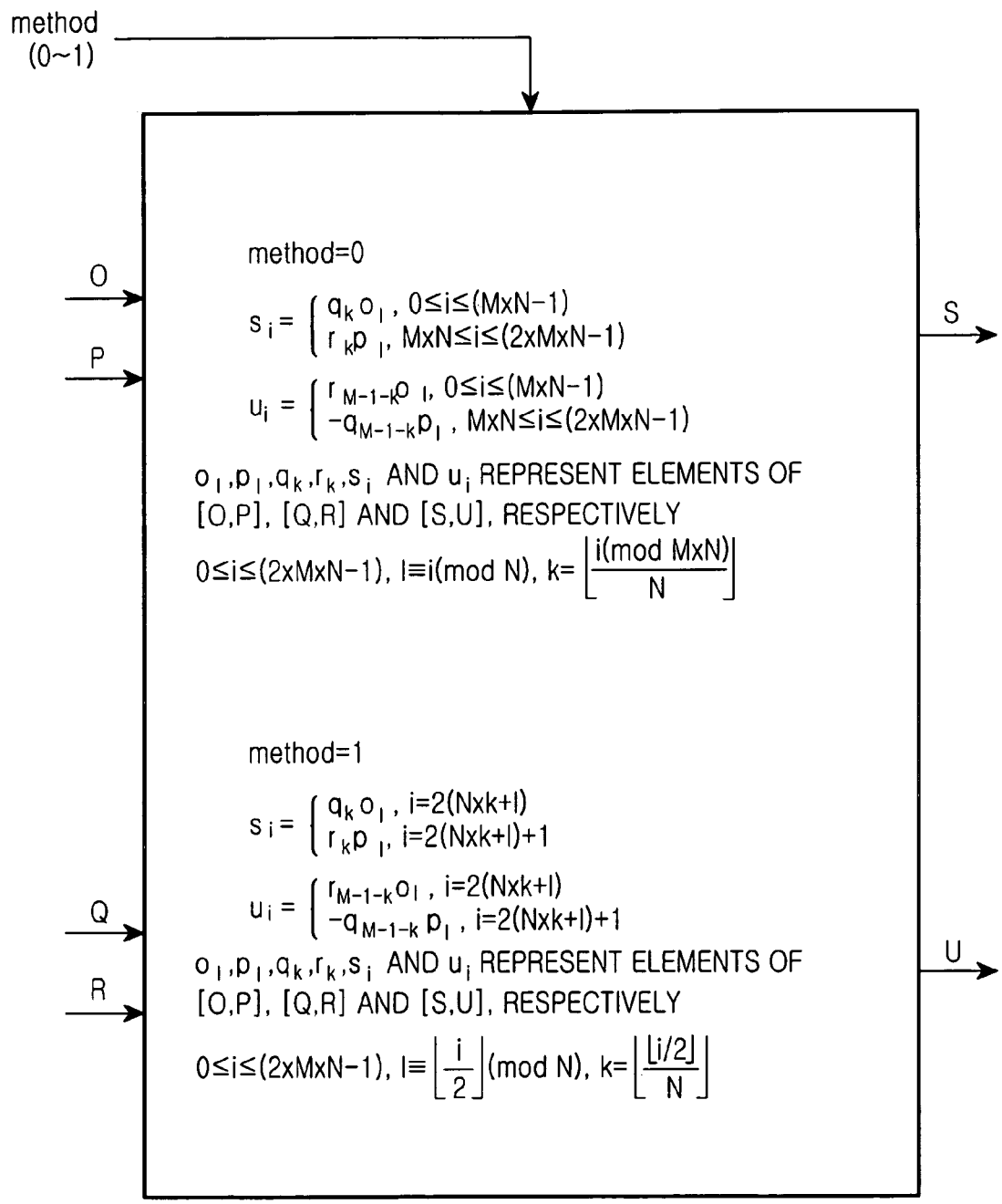
FIG. 11 is a diagram illustrating a Golay complementary sequence pair combing rule according to an embodiment of the present invention.

FIG. 11 illustrates a Golay complementary sequence pair combing rule according to an embodiment of the present invention. Referring to FIG. 11, the Golay complementary sequence pair combiner 615 illustrated in FIG. 6 combines a length-2×M×N Golay complementary sequence pair according to a Golay complementary sequence pair combing rule 'method'. The Golay complementary sequence pair combing rule 'method' is as follows:

method = 0

$$s_i = \begin{cases} q_k o_l, & 0 \leq i \leq (M \times N - 1) \\ r_k p_l, & M \times N \leq i \leq (2 \times M \times N - 1) \end{cases}$$

$$u_i = \begin{cases} r_{M-1-k} o_l, & 0 \leq i \leq (M \times N - 1) \\ -q_{M-1-k} p_l, & M \times N \leq i \leq (2 \times M \times N - 1) \end{cases}$$

method = 1

$$s_i = \begin{cases} q_k o_l, & i = 2(N \times k + 1) \\ r_k p_l, & i = 2(N \times k + 1) + 1 \end{cases}$$

$$u_i = \begin{cases} r_{M-1-k} o_l, & i = 2(N \times k + 1) \\ -q_{M-1-k} p_l, & i = 2(N \times k + 1) + 1 \end{cases}$$

In the Golay Complementary Sequence Pair Combing Rule, $o_l$ and $p_l$ represent elements constituting a length-N Golay complementary sequence pair [O,P], $q_k$ and $r_k$ represent elements constituting a length-M Golay complementary sequence pair [Q,R], and $s_i$ and $u_i$ represent elements constituting a length-2×M×N Golay complementary sequence pair [S,U]. Here, for method=0, i, l, and k satisfy a condition of Equation (3) below.

$$0 \leq i \leq (2 \times M \times N - 1), \, l \equiv i(\bmod N), \, k = \left\lfloor \frac{i(\bmod M \times N)}{N} \right\rfloor \quad (3)$$

For method=1, i, l, and k satisfy a condition of Equation (4) below.

$$0 \leq i \leq (2 \times M \times N - 1), \, l \equiv \left\lfloor \frac{i}{2} \right\rfloor i(\bmod N), \, k = \left\lfloor \frac{\lfloor i/2 \rfloor}{N} \right\rfloor \quad (4)$$

As a result, in the Golay complementary sequence generation apparatus illustrated in FIG. 6, if the controller assigns a parameter 'method' indicating the Golay complementary sequence pair combining rule in accordance with the Golay Complementary Sequence Pair Combining Rule, the Golay complementary sequence pair combiner 615 generates a length-2×M×N Golay complementary sequence pair [S,U] by combining a length-N Golay complementary sequence pair [O,P] with a length-M Golay complementary sequence pair [Q,R].

3. Length-200 Golay Complementary Sequence Pair Combining Rule

Figure 12:
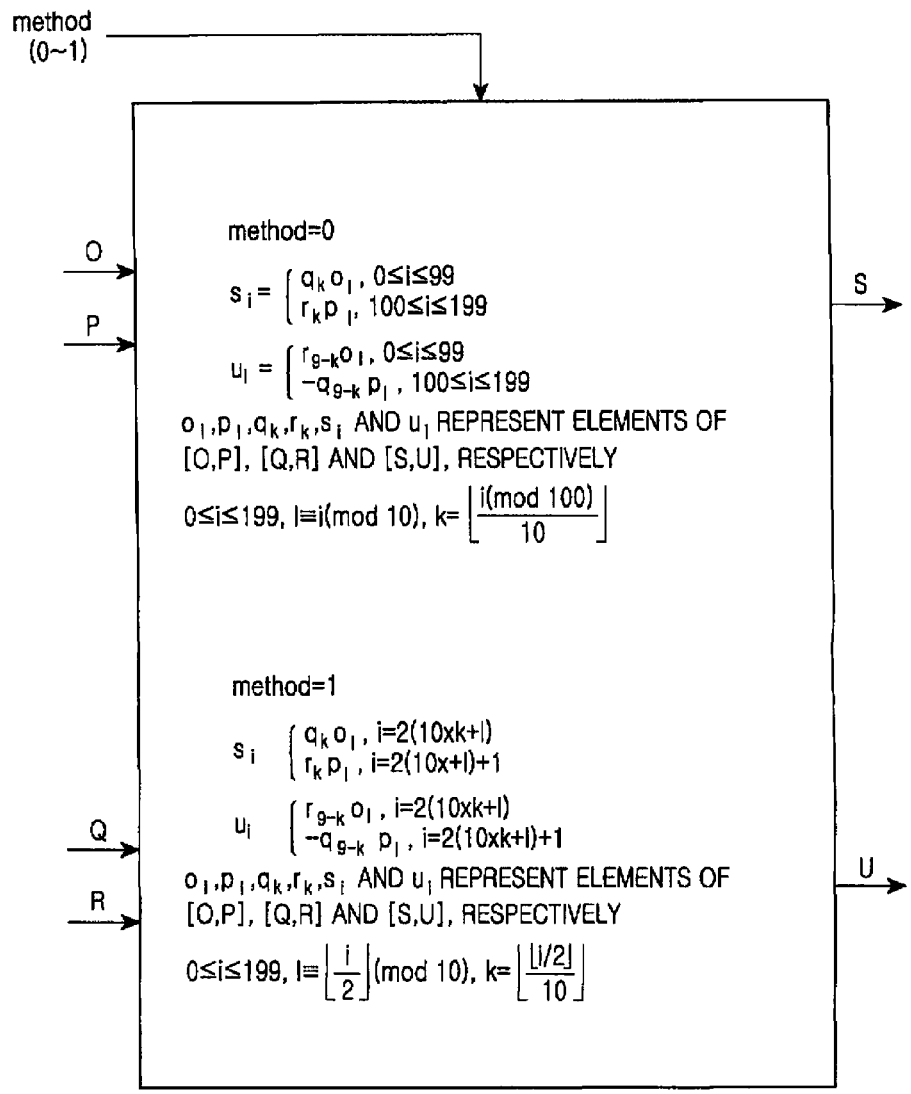
FIG. 12 is a diagram illustrating a procedure for generating a length-200 Golay complementary sequence pair [E,F] by combining a length-10 Golay complementary sequence pair [A,B] with a length-10 Golay complementary sequence pair [C,D]

FIG. 12 is a diagram illustrating a procedure for generating a length-200 Golay complementary sequence pair [S,U] by combining a length-10 Golay complementary sequence pair [O,P] with a length-10 Golay complementary sequence pair [Q,R]. Referring to FIG. 12, the Golay complementary sequence pair combiner 615, as described in conjunction with FIG. 6, is provided with a parameter 'method' indicting the Golay Complementary Sequence Pair Combining Rule from the controller, and generates a length-200 Golay complementary sequence pair [S,U] according to the provided parameter 'method'. The parameter 'method' indicating the Golay Complementary Sequence Pair Combining Rule has a value of 0 or 1, and the two kinds of Golay Complementary Sequence Pair Combining Rules are as follows:

method = 0

$$s_i = \begin{cases} q_k o_l, & 0 \leq i \leq 99 \\ r_k p_l, & 100 \leq i \leq 199 \end{cases}$$

$$u_i = \begin{cases} r_{g-k} o_l, & 0 \leq i \leq 99 \\ -q_{g-k} p_l, & 100 \leq i \leq 199 \end{cases}$$

method = 1

$$s_i = \begin{cases} q_k o_l, & i = 2(10 \times k + 1) \\ r_k p_l, & i = 2(10 \times k1) + 1 \end{cases}$$

$$u_i = \begin{cases} r_{9-k} o_l, & i = 2(10 \times k + 1) \\ -q_{g-k} p_l, & i = 2(10 \times k + 1) + 1 \end{cases}$$

In the Length-200 Golay Complementary Sequence Pair Combining Rule, $o_l$ and $p_l$ represent elements constituting a length-10 Golay complementary sequence pair [O,P], $q_k$ and $r_k$ represent elements constituting a length-10 Golay complementary sequence pair [Q,R], and $s_i$ and $u_i$ represent elements constituting a length-200 Golay complementary sequence pair [S,U]. Here, for method=0, i, l, and k satisfy a condition of Equation (5) below.

$$0 \leq i \leq 199, l \equiv i(\bmod 10), k = \left\lfloor \frac{i(\bmod 100)}{10} \right\rfloor \quad (5)$$

For method=1, i, l, and k satisfy a condition of Equation (6) below.

$$0 \leq i \leq 199, l \equiv \left\lfloor \frac{i}{2} \right\rfloor (\bmod 10), k = \left\lfloor \frac{\lfloor i/2 \rfloor}{N} \right\rfloor \quad (6)$$

Figure 13:
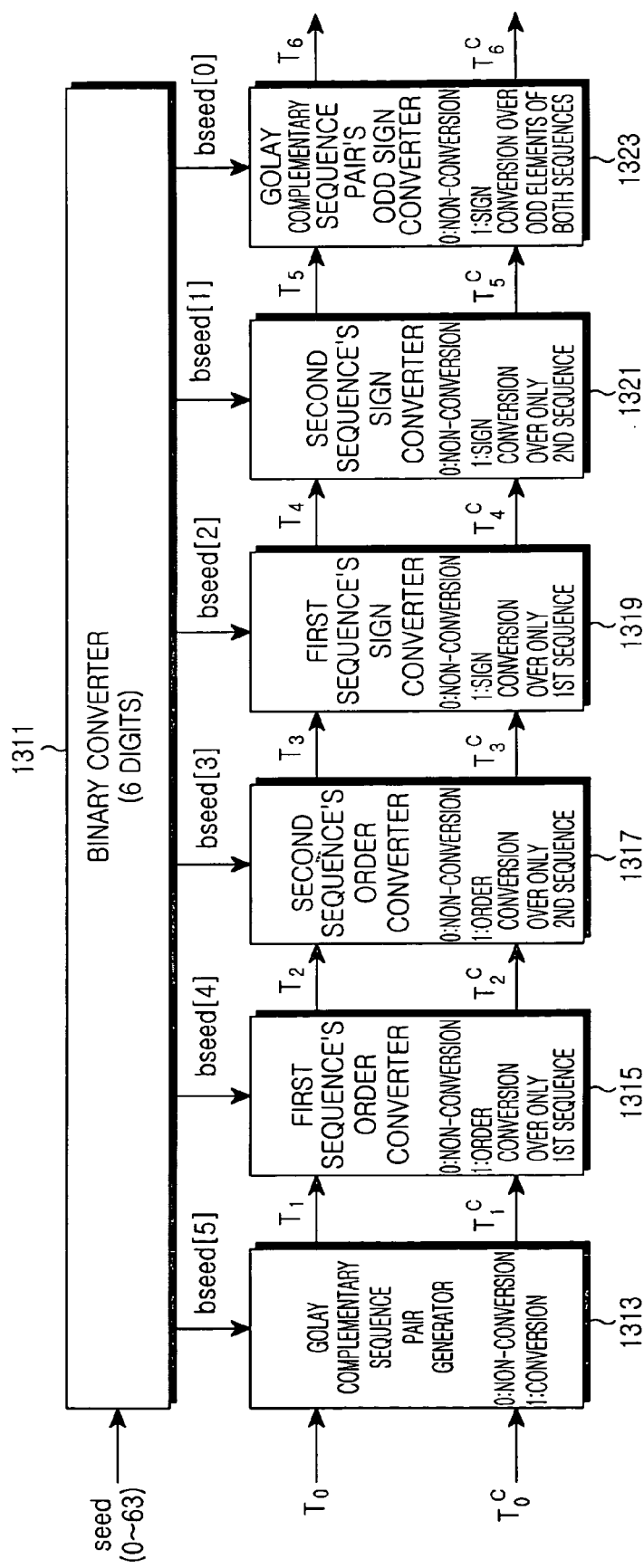
FIG. 13 is a block diagram illustrating a structure of the Golay complementary sequence conjugate pair generator illustrated in FIG. 6.

FIG. 13 is a block diagram illustrating a structure of the Golay complementary sequence conjugate pair generator 617 illustrated in FIG. 6. Referring to FIG. 13, the Golay complementary sequence conjugate pair generator 617, as described in conjunction with FIG. 6, is provided with a parameter 'seed' for selecting a conjugate pair of a primitive Golay complementary sequence pair from the controller, and generates a Golay complementary sequence conjugate pair according to the provided parameter 'seed'. A procedure for actually generating a Golay complementary sequence conjugate pair according to the parameter 'seed' will be described herein below.

The parameter 'seed' is applied to a binary converter 1311, and the binary converter 1311 converts the parameter 'seed' into a binary number. Here, because there are 64 Golay complementary sequence conjugate pairs as described above, the parameter 'seed' has an integer of 0 to 63. Thus, the binary converter 1311 converts the parameter 'seed' into a 6-digit binary number, and each of the converted 6 binary digits will be represented by bseed[n]. That is, bseed[0] represents a value of a digit corresponding to $2^0$ in the 6-digit binary number, based[1] represents a value of a digit corresponding to $2^1$ in the 6-digit binary number, based[2] represents a value of a digit corresponding to $2^2$ in the 6-digit binary number, based[3] represents a value of a digit corresponding to $2^3$ in the 6-digit binary number, based[4] represents a value of a digit corresponding to $2^4$ in the 6-digit binary number, and based[5] represents a value of a digit corresponding to $2^5$ in the 6-digit binary number. For example, if the parameter 'seed' is 3, then bseed[5]=0, bseed[4]=0, bseed[3]=0, bseed[2]=0, bseed[1]=1, and bseed[0]=1.

In this way, the binary converter 1311 binary-converts the parameter 'seed' and outputs bseed[5], bseed[4], bseed[3], bseed[2], bseed[1], and bseed[0]. The bseed[5], bseed[4], bseed[3], bseed[2], bseed[1], and bseed[0] are applied to a Golay complementary sequence pair converter 1313, a first sequence's order converter 1315, a second sequence's order converter 1317, a first sequence's sign converter 1319, a second sequence's sign converter 1321, and a Golay complementary sequence pair's odd sign converter 1323, respectively.

A length-N primitive Golay complementary sequence pair $[T_0, T_0^C]$ is applied to the Golay complementary sequence pair converter 1313. If bseed[5] output from the binary converter 1311 is 1, the Golay complementary sequence pair converter 1313 converts order of the length-N primitive Golay complementary sequence pair $[T_0, T_0^C]$ into $[T_0^C, T_0]$, and outputs $[T_1, T_1^C]$. Here, the $[T_1, T_1^C]$ represents a Golay complementary sequence output from the Golay complementary sequence pair converter 1313. However, if bseed[5] output from the binary converter 1311 is 0, the Golay complementary sequence pair converter 1313 outputs $[T_1, T_1^C]$ without converting the order of the length-N primitive Golay complementary sequence pair $[T_0, T_0^C]$.

The $[T_1, T_1^C]$ output from the Golay complementary sequence pair converter 1313 is applied to the first sequence's order converter 1315. If bseed[4] output from the binary converter 1311 is 1, the first sequence's order converter 1315 converts order of a first sequence $T_1$ of the $[T_1, T_1^C]$ to generate it as $T_2$, and generates $T_1$ as $T_2^C$ without order conversion. However, if bseed[4] output from the binary converter 1311 is 0, the first sequence's order converter 1315 generates $[T_1, T_1^C]$ as $[T_2, T_2^C]$ without order conversion.

The $[T_2, T_2^C]$ output from the first sequence's order converter 1315 is applied to the second sequence's order converter 1317. If bseed[3] output from the binary converter 1311 is 1, the second sequence's order converter 1317 converts order of a second sequence $T_2^C$ of the $[T_2, T_2^C]$ to generate it as $T_3^C$, and generates $T_2$ as $T_3$ without order conversion. In contrast, if bseed[3] output from the binary converter 1311 is 0, the second sequence's order converter 1317 generates $[T_2, T_2^C]$ as $[T_3, T_3^C]$ without order conversion.

The $[T_3, T_3^C]$ output from the second sequence's order converter 1317 is applied to the first sequence's sign converter 1319. If bseed[2] output from the binary converter 1311 is 1, the first sequence's sign converter 1319 converts a sign of a first sequence $T_3$ of the $[T_3, T_3^C]$ to generate it as $T_4$, and generates $T_3$ as $T_4$ without sign conversion. In contrast, if bseed[2] output from the binary converter 1311 is 0, the first sequence's sign converter 1319 generates $[T_3, T_3^C]$ as $[T_4, T_4^C]$ without sign conversion.

The $[T_4, T_4^C]$ output from the first sequence's sign converter 1319 is applied to the second sequence's sign converter 1321. If bseed[1] output from the binary converter 1311 is 1, the second sequence's sign converter 1321 converts a sign of a second sequence $T_4^C$ of the $[T_4, T_4^C]$ to generate it as $T_5^C$, and generates $T_4$ as $T_5$ without sign conversion. In contrast, if bseed[1] output from the binary converter 1311 is 0, the second sequence's sign converter 1321 generates $[T_4, T_4^C]$ as $[T_5, T_5^C]$ without sign conversion.

The $[T_5, T_5^C]$ output from the second sequence's sign converter 1321 is applied to the Golay complementary sequence pair's odd sign converter 1323. If bseed[0] output from the binary converter 1311 is 1, the Golay complementary sequence pair's odd sign converter 1323 converts a sign of odd constituent elements of the two sequences $T_5$ and $T_5^C$ of the $[T_5, T_5^C]$ to generate $T_6$ and $T_6^C$. However, if bseed[0] output from the binary converter 1311 is 0, the Golay complementary sequence pair's odd sign converter 1323 generates $[T_5, T_5^C]$ as $[T_6, T_6^C]$ without sign conversion.

As a result, the $[T_6, T_6^C]$ output from the Golay complementary sequence pair's odd sign converter 1323 becomes an output of the Golay complementary sequence conjugate pair generator 617. Also, all of the sequences generated by sequence conversion by the Golay complementary sequence pair converter 1313, the first sequence's order converter 1315, the second sequence's order converter 1317, the first sequence's sign converter 1319, the second sequence's sign converter 1321, and the Golay complementary sequence pair's odd sign converter 1323 have a characteristic of a Golay complementary sequence pair. Therefore, it is possible to generate 64 Golay complementary sequence conjugate pairs using the characteristic of the Golay complementary sequence pair.

Figure 14:
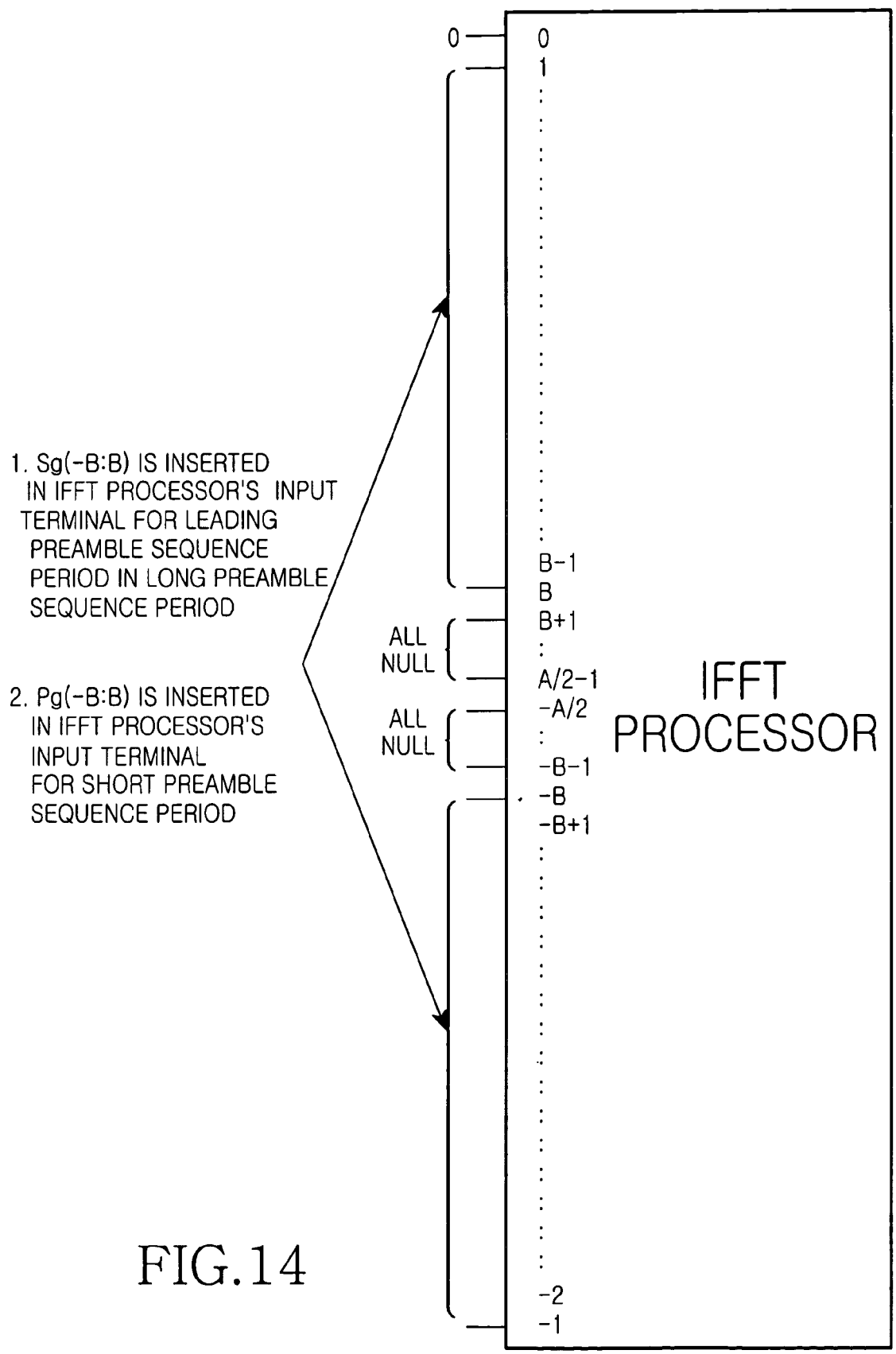
FIG. 14 is a block diagram illustrating a mapping relation between subcarriers and a preamble sequence during IFFT processing in an OFDM communication system according another embodiment of the present invention.

FIG. 14 is a block diagram illustrating a mapping relation between subcarriers and a preamble sequence during IFFT processing in an OFDM communication system according an embodiment of the present invention. It will be assumed in FIG. 14 that the total number of subcarriers of the OFDM communication system is A and unique numbers of subcarriers actually in use among the A subcarriers are [−B, −B+1, . . . ,−1,1, . . . ,B−1,B]. In FIG. 14, numerals at an IFFT processor's input terminal represent unique numbers of subcarriers in the OFDM communication system. As described above, null data is inserted into a $0^{th}$ subcarrier because the $0^{th}$ subcarrier, after performing IFFT, represents a reference point of a preamble sequence in a time domain, i.e., represents a DC component in a time domain. In addition, null data is also inserted into $-(A/2)^{th}$ to $-(B+1)^{th}$ subcarriers and $(B+1)^{th}$ to $(A/2-1)^{th}$ subcarriers, excluding the 2B subcarriers actually in use and the $0^{th}$ subcarrier. The reason for inserting null data into the $-(A/2)^{th}$ to $-(B+1)^{th}$ subcarriers and the $(B+1)^{th}$ to $(A/2-1)^{th}$ subcarriers is because the $-(A/2)^{th}$ to $-(B+1)^{th}$ subcarriers and the $(B+1)^{th}$ to $(A/2-1)^{th}$ subcarriers correspond to a guard interval. Therefore, if the frequency-domain preamble sequence Sg(−B:B) or Pg(−B:B) is applied to the IFFT processor, the IFFT processor performs IFFT after mapping the received frequency-domain preamble sequence Sg(−B:B) or Pg(−B:B) to corresponding subcarriers, and outputs a time-domain preamble sequence. The Sg(−B:B) is applied to the IFFT processor for a leading preamble sequence period in a long preamble period, while the Pg(−B:B) is applied to the IFFT processor for a short preamble sequence period.

Figure 15:
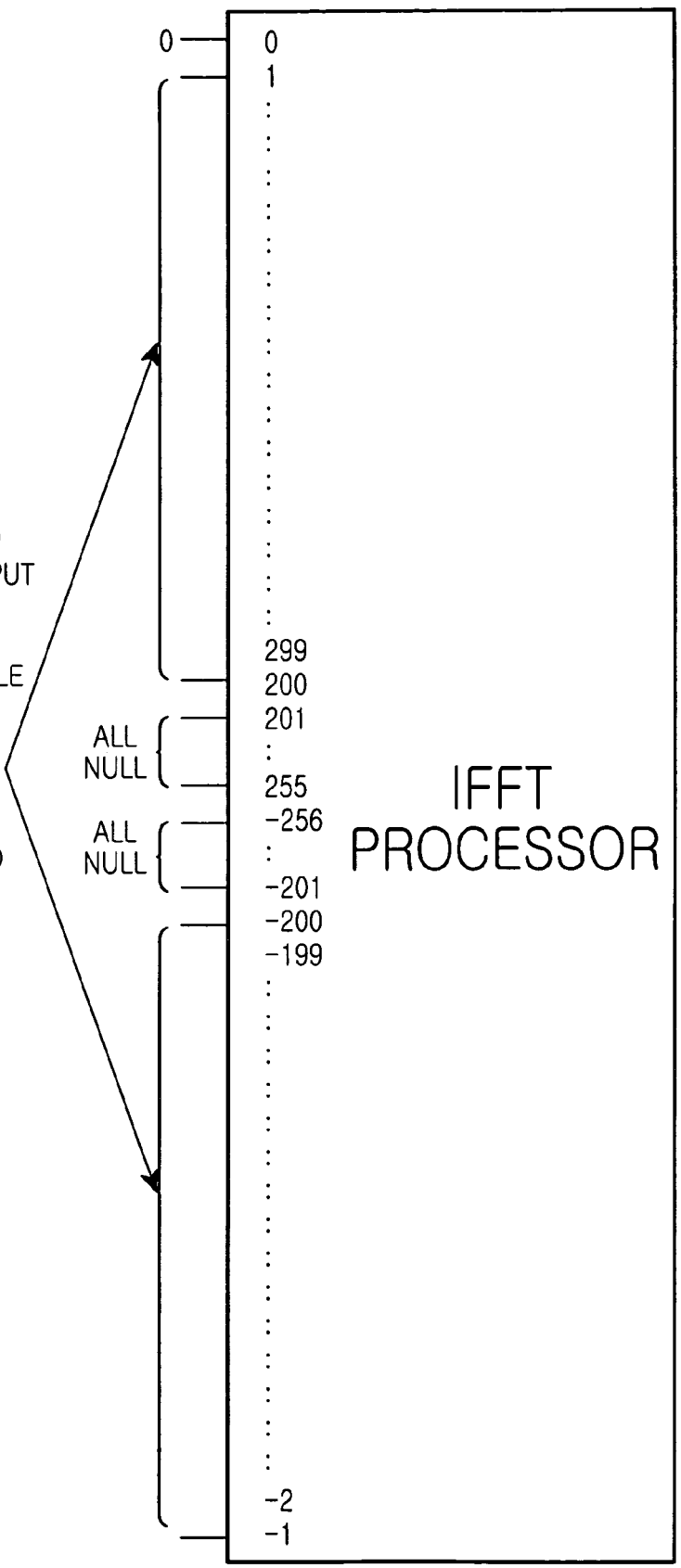
FIG. 15 is a block diagram illustrating a mapping relation between subcarriers and a preamble sequence during IFFT processing in an OFDM communication system having 512 subcarriers.

FIG. 15 is a block diagram illustrating a mapping relation between subcarriers and a preamble sequence during IFFT processing in an OFDM communication system having 512 subcarriers. It will be assumed in FIG. 15 that there are 512 subcarriers of $-256^{th}$ to $255^{th}$ subcarriers, and the number of subcarriers actually in use is 400, including $-200^{th}$, . . . , $-1^{st}, 1^{st}$, . . . ,$200^{th}$ subcarriers. As described in conjunction with FIG. 14, because a $0^{th}$ subcarrier functions as a DC component and $-256^{th}$ to $-201^{st}$ subcarriers and $201^{st}$ to $255^{th}$ subcarriers function as a guard interval, null data is inserted therein. Thus, a frequency-domain preamble sequence Sg(−200:200) or Pg(−200:200) is inserted into an input terminal of an IFFT processor, and the IFFT processor performs IFFT on the received Sg(−200:200) or Pg(−200:200) and outputs a time-domain preamble sequence. The Sg(−200:200) is inserted into the input terminal of the IFFT processor for a leading preamble sequence period in a long preamble period, and the Pg(−200:200) is inserted into the input terminal of the IFFT processor for a short preamble sequence period.

The Sg(−200:200) or Pg(−200:200) is generated by the preamble sequence generator illustrated in FIG. 5, and the present invention will be described on the assumption that the preamble sequence generator generates the Pg(−200:200). All preamble sequences generated by the preamble sequence generator have a PAPR less than 3 [dB], and the lowest PAPR is 2.8455 [dB] among PAPRs of all Golay complementary sequences that can be obtained by a combination of all parameters M, N, pNum0, pNum1, seed0, seed1, seed2, 'method', and 'select' used in the 2×M×N Golay complementary sequence generator illustrated in FIG. 6. The parameters M, N, pNum0, pNum1, seed0, seed1, seed2, 'method', and 'select' for generating a Golay complementary sequence for the PAPR=2.8455 [dB] can have different values, and Table 1 below shows seed0 and seed1 on the assumption that pNum0=pNum1=method=select=seed2=0.

TABLE 1

| seed0 | seed1 |
|-------|-------|
| 24 | 35 |
| 24 | 37 |
| 25 | 35 |
| 25 | 37 |
| 26 | 33 |
| 26 | 39 |
| 27 | 33 |
| 27 | 39 |
| 28 | 33 |
| 28 | 39 |
| 29 | 33 |
| 29 | 39 |
| 30 | 35 |
| 30 | 37 |
| 31 | 35 |
| 31 | 37 |
| 32 | 27 |
| 32 | 29 |
| 33 | 27 |
| 33 | 29 |
| 34 | 25 |
| 34 | 31 |
| 35 | 25 |
| 35 | 31 |
| 36 | 25 |
| 36 | 31 |
| 37 | 25 |
| 37 | 31 |
| 38 | 27 |
| 38 | 29 |
| 39 | 27 |
| 39 | 29 |

In Table 1, if pNum0=pNum1=method=select=seed2=0, seed0=24 and seed1=35, then the Pg(−200:200) is given by

```
Pg         0  1  0  1  0 -1  0 -1  0  1  0 -1
(-200:200) = {
           0  1  0 -1  0  1  0  1  0 -1  0 -1
           0  1  0  1  0 -1  0  1  0 -1  0  1
           0 -1  0 -1  0 -1  0 -1  0 -1  0  1
           0 -1  0  1  0 -1  0 -1  0 -1  0 -1
           0 -1  0 -1  0  1  0  1  0 -1  0  1
           0 -1  0  1  0 -1  0 -1  0  1  0  1
           0 -1  0 -1  0  1  0 -1  0  1  0 -1
           0  1  0  1  0 -1  0 -1  0  1  0  1
           0 -1  0  1  0 -1  0  1  0 -1  0 -1
           0  1  0  1  0 -1  0 -1  0  1  0 -1
           0  1  0 -1  0  1  0  1  0 -1  0  1
           0  1  0  1  0 -1  0  1  0 -1  0  1
           0 -1  0 -1  0 -1  0 -1  0  1  0  1
           0 -1  0  1  0 -1  0  1  0 -1  0 -1
           0  1  0 -1  0 -1  0  1  0  1  0 -1
           0  1  0 -1  0  1  0  1  0  1  0  1
           0 -1  0 -1  0 -1  0 -1  0 -1  0  1
           0 -1  0 -1  0 -1  0 -1  0  1  0  1
           0  1  0  1  0  1  0 -1  0  1  0  1
           0 -1  0 -1  0  1  0  1  0  1  0  1
           0  1  0 -1  0  1  0  1  0 -1  0 -1
           0  1  0  1  0  1  0  1  0  1  0 -1
           0  1  0  1  0 -1  0 -1  0  1  0  1
           0  1  0  1  0 -1  0  1  0  1  0  1
           0 -1  0 -1  0  1  0  1  0  1  0  1
           0  1  0 -1  0  1  0  1  0 -1  0 -1
           0  1  0  1  0  1  0  1  0 -1  0 -1
           0  1  0  1  0  1  0  1  0 -1  0 -1
           0 -1  0 -1  0 -1  0  1  0 -1  0 -1
           0  1  0  1  0 -1  0 -1  0 -1  0 -1
           0 -1  0  1  0 -1  0 -1  0 -1  0 -1
           0  1  0  1  0  1  0  1  0  1  0 -1
           0  1  0  1  0  } * sqrt(2) * sqrt(2) ± 1
```

Describing the Pg(−200:200), it can be noted that data of +1 or −1 is inserted into odd constituent elements while null data, or 0, is inserted into even constituent elements.

Figure 16:
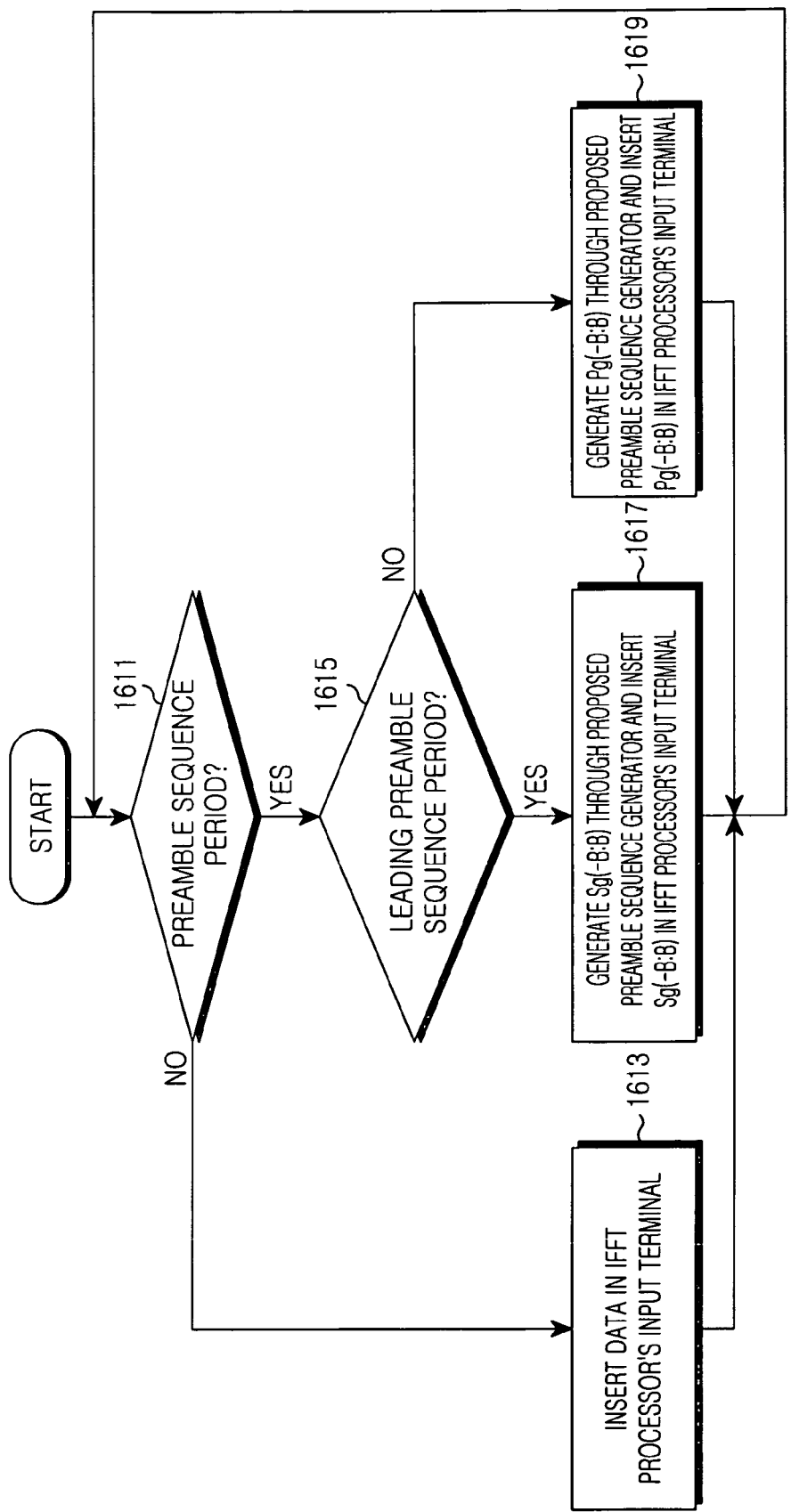
FIG. 16 is a flowchart illustrating a preamble sequence mapping procedure according to another embodiment of the present invention.

FIG. 16 is a flowchart illustrating a preamble sequence mapping procedure according to a further embodiment of the present invention. Referring to FIG. 16, a transmitter of an OFDM communication system determines in step 1611 whether a current signal transmission period is a preamble sequence transmission period. If the current signal transmission period is not a preamble sequence transmission period, but a data transmission period, the transmitter proceeds to step 1613. In step 1613, the transmitter maps transmission data to corresponding subcarriers on an IFFT processor's input terminal, and then returns to the step 1611.

However, if it is determined in step 1611 that the current signal transmission period is a preamble sequence transmission period, the transmitter proceeds to step 1615, where the transmitter determines whether the preamble sequence transmission period is a period for which a leading preamble sequence of a long preamble sequence is transmitted. Here, in the preamble sequence transmission period, the leading preamble sequence of a long preamble sequence means a sequence Sg(−B:B). If it is determined that the preamble sequence transmission period is a period for which a leading preamble sequence of a long preamble sequence is transmitted, the transmitter proceeds to step 1617.

In step 1617, the transmitter generates a leading preamble sequence Sg(−B:B) of the long preamble sequence, maps the generated preamble sequence Sg(−B:B) to corresponding subcarriers on the IFFT processor's input terminal, and then returns to the step 1611. "−B:B" represents unique numbers of subcarriers where data is actually used in the OFDM communication system. However, if it is determined in step 1615 that the preamble sequence transmission period is not a period for which a leading preamble sequence Sg(−B:B) of a long preamble sequence is transmitted, i.e., if the preamble sequence transmission period is a period for which a short preamble sequence Pg(−B:B) is transmitted, then the transmitter proceeds to step 1619. In step 1619, the transmitter generates the short preamble sequence Pg(−B:B), maps the generated short preamble sequence Pg(−B:B) to corresponding subcarriers on the IFFT processor's input terminal, and then returns to the step 1611.

As can be understood from the foregoing description, the present invention generates a preamble sequence having a minimum PAPR, contributing to improvement in overall performance of an OFDM communication system. In addition, the present invention generates a preamble sequence using a Golay complementary sequence, making it possible to generate a preamble sequence having a minimum PAPR with a minimized number of operations within a shorter time.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for generating a preamble sequence in an orthogonal frequency division multiplexing (OFDM) communication system having A subcarriers in a frequency domain, the apparatus comprising:
   a preamble sequence generator for generating a length-2×M×N preamble sequence, where 2×M×N is less than A, by using a length-N Golay complementary sequence and a length-M Golay complementary sequence; and
   an inverse fast Fourier transform (IFFT) processor for assigning elements constituting the preamble sequence to 2×M×N subcarriers among the A subcarriers on a one-to-one mapping basis, assigning null data to remaining subcarriers excluding the 2×M×N subcarriers from the A subcarriers, and then IFFT-transforming the assigned result into time-domain data.

2. The apparatus of claim 1, wherein the preamble sequence generator comprises:
   a Golay complementary sequence generator for generating a length-2×M×N Golay complementary sequence by combining the length-N Golay complementary sequence with the length-M Golay complementary sequence; and
   a Golay complementary sequence/preamble sequence mapper for generating the preamble sequence so that elements constituting the length-2×M×N Golay complementary sequence are mapped to the 2×M×N subcarriers among the A subcarriers at a preset interval on a one-to-one basis.

3. The apparatus of claim 2, wherein the Golay complementary sequence generator comprises:
   a first Golay complementary sequence pair generator for generating a length-N Golay complementary sequence pair;
   a second Golay complementary sequence pair generator for generating a length-M Golay complementary sequence pair;
   a Golay complementary sequence pair combiner for combining the length-N Golay complementary sequence pair with the length-M Golay complementary sequence pair according to a Golay complementary sequence pair combining rule, and outputting a length-2×M×N Golay complementary sequence pair;
   a first Golay complementary sequence conjugate pair generator for generating a length-2×M×N Golay complementary sequence conjugate pair by selecting one of conjugate pairs of the length-2×M×N Golay complementary sequence pair; and a selector for selecting any one of the length-2×M×N Golay complementary sequence pair generated from the Golay complementary sequence pair combiner and the length-2×M×N Golay complementary sequence conjugate pair generated from the first Golay complementary sequence conjugate pair generator, as a final length-2×M×N Golay complementary sequence.

4. The apparatus of claim 3, wherein the first Golay complementary sequence pair generator comprises:
a selector for selecting one primitive Golay complementary sequence pair among length-N primitive Golay complementary sequence pairs; and
a second Golay complementary sequence conjugate pair generator for generating a length-N Golay complementary sequence conjugate pair by selecting one primitive Golay complementary sequence conjugate pair from conjugate pairs of the selected primitive Golay complementary sequence pair.

5. The apparatus of claim 3, wherein the second Golay complementary sequence pair generator comprises:
a selector for selecting one primitive Golay complementary sequence pair among length-M primitive Golay complementary sequence pairs; and
a second Golay complementary sequence conjugate pair generator for generating a length-M Golay complementary sequence conjugate pair by selecting one primitive Golay complementary sequence conjugate pair from conjugate pairs of the selected primitive Golay complementary sequence pair.

6. The apparatus of claim 3, wherein the Golay complementary sequence pair combiner generates the length-2×M×N Golay complementary sequence pair according to a parameter 'method' according to a Golay complementary sequence pair combining rule, wherein method = 0

$$s_i = \begin{cases} q_k o_l, 0 \le i \le (M \times N - 1) \\ r_k p_l, M \times N \le i \le (2 \times M \times N - 1) \end{cases}$$

$$u_i = \begin{cases} r_{M-1-k} o_l, 0 \le i \le (M \times N - 1) \\ -q_{M-1-k} p_l, M \times N \le i \le (2 \times M \times N - 1) \end{cases}$$

method = 1

$$s_i = \begin{cases} q_k o_l, i = 2(N \times k + 1) \\ r_k p_l, i = 2(N \times k + 1) + 1 \end{cases}$$

$$u_i = \begin{cases} r_{M-1-k} o_l, i = 2(N \times k + 1) \\ -q_{M-1-k} p_l, i = 2(N \times k + 1) + 1 \end{cases}$$

where $o_l$ and $p_l$ represent elements constituting a length-N Golay complementary sequence pair [O,P], $q_k$ and $r_k$ represent elements constituting a length-M Golay complementary sequence pair [Q,R], and $s_i$ and $u_i$ represent elements constituting a length-2×M×N Golay complementary sequence pair [S,U], where i, l, and k satisfy $$0 \le i \le (2 \times M \times N - 1), l \equiv i(\bmod N),$$

$$k = \left\lfloor \frac{i(\bmod M \times N)}{N} \right\rfloor \text{ (for method} = 0)$$

$$0 \le i \le (2 \times M \times N - 1), l \equiv \left\lfloor \frac{i}{2} \right\rfloor i(\bmod N), k = \left\lfloor \frac{\lfloor i/2 \rfloor}{N} \right\rfloor \text{ (for method} = 1).$$

7. The apparatus of claim 2, wherein the Golay complementary sequence/preamble sequence mapper performs a control operation in which elements having a value of +1 or −1 among elements constituting the length-2×M×N Golay complementary sequence are not mapped to a subcarrier corresponding to a time-domain direct current (DC) component among the 2×M×N subcarriers.

8. The apparatus of claim 2, wherein the Golay complementary sequence/preamble sequence mapper performs a control operation in which elements having a value of +1 or −1 among elements constituting the length 2×M×N Golay complementary sequence are mapped to odd subcarriers among the 2×M×N subcarriers.

9. The apparatus of claim 2, wherein the Golay complementary sequence/preamble sequence mapper performs a control operation in which elements constituting the length 2×M×N Golay complementary sequence are mapped to the 2×M×N subcarriers at a preset interval in accordance with $$L(i) = \begin{cases} J(n), & i = GPM(n) \\ 0, & i \ne GPM(n) \end{cases}$$

where n in GPM(n) represents an index of elements constituting a Golay complementary sequence and GPM(n) represents an index of elements constituting a preamble sequence.

10. The apparatus of claim 9, wherein the GPM(n) is defined as $$GPM(n) = -(B-E-nI)$$

where $-B \le i \le B$, $0 \le n \le (2 \times M \times N - 1)$, −B represents an initial subcarrier number of subcarriers excluding the subcarriers where the null data is inserted among the A subcarriers, and B represents a last subcarrier number.

11. The apparatus of claim 2, wherein the preset interval is defined as $$B = Ik + D \text{ (for } 0 \le D \le (I-1))$$

where I represents the preset interval, wherein if a parameter D=0, then E=1, 2, ..., I−1 and F=I−E, and if D=1, ..., I−1, then E=0, ..., I−1 (D+E≠F) and F=(B−F) mod I=D+E (for $0 \le F \le (I-1)$).

12. The apparatus of claim 3, wherein the first Golay complementary sequence conjugate pair generator comprises:
a binary converter for receiving a select value for selecting one conjugate pair from conjugate pairs of the length-2×M×N Golay complementary sequence pair, and binary-converting the select value into a 6-digit binary number;
a Golay complementary sequence pair converter for receiving a length-2×M×N Golay complementary sequence pair $[T_0, T_0^C]$ output from the Golay complementary sequence pair combiner, receiving a value of a digit corresponding to $2^5$ in the 6-digit binary number output from the binary converter, and one of outputting the Golay complementary sequence pair $[T_0, T_0^C]$ as $[T_1, T_1^C]$ without conversion and converting order of the Golay complementary sequence pair $[T_0, T_0^C]$ to output $[T_0^C, T_0]$ as $[T_1, T_1^C]$, according to the received digit value;
a first sequence's order converter for receiving a Golay complementary sequence pair $[T_1, T_1^C]$ output from the Golay complementary sequence pair converter, receiving a value of a digit corresponding to $2^4$ in the 6-digit binary number output from the binary converter, and one of outputting the Golay complementary sequence pair $[T_1,T_1^C]$ as $[T_2,T_2^C]$ without order conversion and converting order of only a first sequence of the Golay complementary sequence pair $[T_1,T_1^C]$ to output $[T_2, T_2^C]$, according to the received digit value;

a second sequence's order converter for receiving a Golay complementary sequence pair $[T_2,T_2^C]$ output from the first sequence's order converter, receiving a value of a digit corresponding to $2^3$ in the 6-digit binary number output from the binary converter, and one of outputting the Golay complementary sequence pair $[T_2,T_2^C]$ as $[T_3,T_3^C]$ without order conversion and converting order of only a second sequence of the Golay complementary sequence pair $[T_2,T_2^C]$ to output $[T_3,T_3^C]$, according to the received digit value;

a first sequence's sign converter for receiving a Golay complementary sequence pair $[T_3,T_3^C]$ output from the second sequence's order converter, receiving a value of a digit corresponding to $2^2$ in the 6-digit binary number output from the binary converter, and one of outputting the Golay complementary sequence pair $[T_3,T_3^C]$ as $[T_4,T_4^C]$ without sign conversion and converting a sign of only a first sequence of the Golay complementary sequence pair $[T_3,T_3^C]$ to output $[-T_3,T_3^C]$ as $[T_4,T_4^C]$, according to the received digit value;

a second sequence's sign converter for receiving a Golay complementary sequence pair $[T_4,T_4^C]$ output from the first sequence's sign converter, receiving a value of a digit corresponding to $2^1$ in the 6-digit binary number output from the binary converter, and one of outputting the Golay complementary sequence pair $[T_4,T_4^C]$ as $[T_5,T_5^C]$ without sign conversion and converting a sign of only a second sequence of the Golay complementary sequence pair $[T_4,T_4^C]$ to output $[T_4,-T_4^C]$ as $[T_5,T_5^C]$, according to the received digit value; and a Golay complementary sequence pair's odd sign converter for receiving a Golay complementary sequence pair $[T_5,T_5^C]$ output from the second sequence's sign converter, receiving a value of a digit corresponding to $2^0$ in the 6-digit binary number output from the binary converter, and one of outputting the Golay complementary sequence pair $[T_5,T_5^C]$ as $[T_6,T_6^C]$ and converting a sign of odd elements of both sequences of the Golay complementary sequence pair $[T_5,T_5^C]$ to output $[T_6, T_6^C]$, according to the received digit value.

13. The apparatus of claim 1, wherein the preamble sequence generator generates preamble sequence Pg(−200:200) for A=512, wherein

| Pg (−200:200) = { | 0 | 1 | 0 | 1 | 0 | −1 | 0 | −1 | 0 | 1 | 0 | −1 |
|---|---|---|---|---|---|---|---|---|---|---|---|---|
| | 0 | 1 | 0 | −1 | 0 | 1 | 0 | 1 | 0 | −1 | 0 | −1 |
| | 0 | 1 | 0 | 1 | 0 | −1 | 0 | 1 | 0 | −1 | 0 | 1 |
| | 0 | −1 | 0 | −1 | 0 | −1 | 0 | −1 | 0 | 1 | 0 | 1 |
| | 0 | −1 | 0 | 1 | 0 | −1 | 0 | 1 | 0 | −1 | 0 | −1 |
| | 0 | −1 | 0 | −1 | 0 | 1 | 0 | 1 | 0 | −1 | 0 | 1 |
| | 0 | −1 | 0 | 1 | 0 | −1 | 0 | −1 | 0 | 1 | 0 | 1 |
| | 0 | −1 | 0 | −1 | 0 | 1 | 0 | −1 | 0 | 1 | 0 | −1 |
| | 0 | −1 | 0 | 1 | 0 | −1 | 0 | −1 | 0 | 1 | 0 | 1 |
| | 0 | 1 | 0 | 1 | 0 | −1 | 0 | 1 | 0 | −1 | 0 | −1 |
| | 0 | 1 | 0 | 1 | 0 | −1 | 0 | −1 | 0 | 1 | 0 | −1 |
| | 0 | 1 | 0 | −1 | 0 | 1 | 0 | 1 | 0 | −1 | 0 | 1 |
| | 0 | 1 | 0 | −1 | 0 | 1 | 0 | 1 | 0 | −1 | 0 | 1 |
| | 0 | −1 | 0 | −1 | 0 | −1 | 0 | 1 | 0 | 1 | 0 | 1 |
| | 0 | 1 | 0 | 1 | 0 | −1 | 0 | 1 | 0 | −1 | 0 | −1 |
| | 0 | 1 | 0 | −1 | 0 | 1 | 0 | 1 | 0 | 1 | 0 | 1 |
| -continued | | | | | | | | | | | | |
| | 0 | −1 | 0 | −1 | 0 | −1 | 0 | −1 | 0 | −1 | 0 | 1 |
| | 0 | −1 | 0 | −1 | 0 | −1 | 0 | −1 | 0 | 1 | 0 | 1 |
| | 0 | 1 | 0 | 1 | 0 | 1 | 0 | −1 | 0 | 1 | 0 | 1 |
| | 0 | −1 | 0 | −1 | 0 | 1 | 0 | 1 | 0 | 1 | 0 | 1 |
| | 0 | 1 | 0 | −1 | 0 | 1 | 0 | 1 | 0 | −1 | 0 | −1 |
| | 0 | 1 | 0 | 1 | 0 | 1 | 0 | 1 | 0 | 1 | 0 | −1 |
| | 0 | 1 | 0 | 1 | 0 | −1 | 0 | −1 | 0 | 1 | 0 | 1 |
| | 0 | 1 | 0 | 1 | 0 | −1 | 0 | 1 | 0 | 1 | 0 | 1 |
| | 0 | −1 | 0 | −1 | 0 | 1 | 0 | 1 | 0 | 1 | 0 | 1 |
| | 0 | 1 | 0 | −1 | 0 | 1 | 0 | 1 | 0 | −1 | 0 | −1 |
| | 0 | 1 | 0 | 1 | 0 | 1 | 0 | 1 | 0 | 1 | 0 | −1 |
| | 0 | 1 | 0 | 1 | 0 | 1 | 0 | −1 | 0 | 0 | 0 | 0 |
| | 0 | −1 | 0 | −1 | 0 | −1 | 0 | 1 | 0 | −1 | 0 | −1 |
| | 0 | 1 | 0 | 1 | 0 | −1 | 0 | −1 | 0 | −1 | 0 | −1 |
| | 0 | −1 | 0 | 1 | 0 | −1 | 0 | −1 | 0 | −1 | 0 | −1 |
| | 0 | 1 | 0 | 1 | 0 | 1 | 0 | 1 | 0 | 1 | 0 | −1 |
| | 0 | 1 | 0 | 1 | 0 | } * sqrt(2) * sqrt(2) ± 1 | | | | | | | wherein "−n:n" represents subcarriers of $-n^{th}$ to $n^{th}$ subcarriers.

14. A method for generating a preamble sequence in an orthogonal frequency division multiplexing (OFDM) communication system having A subcarriers in a frequency domain, the method comprising the steps of:

generating a length-2×M×N preamble sequence, where 2×M×N is less than A, by using a length-N Golay complementary sequence and a length-M Golay complementary sequence; and assigning elements constituting the preamble sequence to 2×M×N subcarriers among the A subcarriers on a one-to-one mapping basis, assigning null data to remaining subcarriers excluding the 2×M×N subcarriers from the A subcarriers, and then IFFT-transforming the assigned result into time-domain data.

15. The method of claim 14, wherein the step of generating the preamble sequence comprises the steps of:

generating a length-2×M×N Golay complementary sequence by combining a length-N Golay complementary sequence with a length-M Golay complementary sequence; and generating the preamble sequence so that elements constituting the length-2×M×N Golay complementary sequence are mapped to the 2×M×N subcarriers among the A subcarriers at a preset interval on a one-to-one basis.

16. The method of claim 15, wherein the step of generating the length-2×M×N Golay complementary sequence comprises the steps of:

generating a length-N Golay complementary sequence pair;

generating a length-M Golay complementary sequence pair;

combining the length-N Golay complementary sequence pair with the length-M Golay complementary sequence pair according to a Golay complementary sequence pair combining rule, and outputting a length-2×M×N Golay complementary sequence pair;

generating a length-2×M×N Golay complementary sequence conjugate pair by selecting one of conjugate pairs of the length-2×M×N Golay complementary sequence pair; and selecting any one of the length-2×M×N Golay complementary sequence pair and the length-2×M×N Golay complementary sequence conjugate pair, as a final length-2×M×N Golay complementary sequence.

17. The method of claim 16, wherein the step of generating the length-N Golay complementary sequence pair comprises the steps of:
　　selecting one primitive Golay complementary sequence pair among length-N primitive Golay complementary sequence pairs; and
　　generating a length-N Golay complementary sequence conjugate pair by selecting one primitive Golay complementary sequence conjugate pair from conjugate pairs of the selected primitive Golay complementary sequence pair.

18. The method of claim 16, wherein the step of generating the length-M Golay complementary sequence pair comprises the steps of:
　　selecting one primitive Golay complementary sequence pair among length-M primitive Golay complementary sequence pairs; and
　　generating a length-M Golay complementary sequence conjugate pair by selecting one primitive Golay complementary sequence conjugate pair from conjugate pairs of the selected primitive Golay complementary sequence pair.

19. The method of claim 16, wherein the step of generating the length-2×M×N Golay complementary sequence pair according to the Golay complementary sequence pair combining rule comprises the step of generating a length-2×M×N Golay complementary sequence pair according to a parameter 'method' according to the Golay complementary sequence pair combining rule, wherein method = 0
$$s_i = \begin{cases} q_k o_l, & 0 \leq i \leq (M \times N - 1) \\ r_k p_l, & M \times N \leq i \leq (2 \times M \times N - 1) \end{cases}$$
$$u_i = \begin{cases} r_{M-1-k} o_l, & 0 \leq i \leq (M \times N - 1) \\ -q_{M-1-k} p_l, & M \times N \leq i \leq (2 \times M \times N - 1) \end{cases}$$

method = 1
$$s_i = \begin{cases} q_k o_l, & i = 2(N \times k + l) \\ r_k p_l, & i = 2(N \times k + l) + 1 \end{cases}$$
$$u_i = \begin{cases} r_{M-1-k} o_l, & i = 2(N \times k + l) \\ -q_{M-1-k} p_l, & i = 2(N \times k + l) + 1 \end{cases}$$

where $o_l$ and $p_l$ represent elements constituting a length-N Golay complementary sequence pair [O,P], $q_k$ and $r_k$ represent elements constituting a length-M Golay complementary sequence pair [Q,R], and $s_i$ and $u_i$ represent elements constituting a length-2×M×N Golay complementary sequence pair [S,U], where i, l, and k satisfy $$0 \leq i \leq (2 \times M \times N - 1), l \equiv i (\mathrm{mod}\, N),$$
$$k = \left\lfloor \frac{i (\mathrm{mod}\, M \times N)}{N} \right\rfloor \text{ (for method = 0)}$$
$$0 \leq i \leq (2 \times M \times N - 1), l \equiv \left\lfloor \frac{i}{2} \right\rfloor i(\mathrm{mod}\, N), k = \left\lfloor \frac{\lfloor i/2 \rfloor}{N} \right\rfloor \text{ (for method = 1)}.$$

20. The method of claim 15, wherein the step of mapping the elements constituting the length-2×M×N Golay complementary sequence to the 2×M×N subcarriers comprises the step of performing a control operation in which elements having a value of +1 or −1 among the elements constituting the length-2×M×N Golay complementary sequence are not mapped to a subcarrier corresponding to a time-domain direct current (DC) component among the 2×M×N subcarriers.

21. The method of claim 15, wherein the step of mapping the elements constituting the length-2×M×N Golay complementary sequence to the 2×M×N subcarriers comprises the step of performing a control operation in which elements having a value of +1 or −1 among elements constituting the length 2×M×N Golay complementary sequence are mapped to odd subcarriers among the 2×M×N subcarriers.

22. The method of claim 15, wherein the step of mapping the elements constituting the length-2×M×N Golay complementary sequence to the 2×M×N subcarriers comprises the step of performing a control operation in which elements constituting the length 2×M×N Golay complementary sequence are mapped to the 2×M×N subcarriers at a preset interval in accordance with $$L(i) = \begin{cases} J(n), & i = GPM(n) \\ 0, & i \neq GPM(n) \end{cases}$$

where n in GPM(n) represents an index of elements constituting a Golay complementary sequence and GPM(n) represents an index of elements constituting a preamble sequence.

23. The method of claim 22, wherein the GPM(n) is defined as $$GPM(n) = -(B - E - nI)$$

where $-B \leq i \leq B$, $0 \leq n \leq (2 \times M \times N - 1)$, $-B$ represents an initial subcarrier number of subcarriers excluding the subcarriers where the null data is inserted among the A subcarriers, and B represents a last subcarrier number.

24. The method of claim 15, wherein the preset interval is defined as $$B = Ik + D \text{ (for } 0 \leq D \leq (I-1))$$

where I represents the preset interval, wherein if a parameter D=0, then E=1, 2, ..., I−1 and F=I−E, and if D=1, ..., I−1, then E=0, ..., I−1 (D+E≠F) and F=(B−F) mod I=D+E (for $0 \leq F \leq (I-1)$).

25. The method of claim 16, wherein the step of generating the Golay complementary sequence conjugate pair comprises the steps of:
　　(a) receiving a select value for selecting one conjugate pair from the conjugate pairs of the length-2×M×N Golay complementary sequence pair, and binary-converting the select value into a 6-digit binary number;
　　(b) receiving a length-2×M×N Golay complementary sequence pair $[T_0, T_0^C]$ generated in the Golay complementary sequence pair combining step, receiving a value of a digit corresponding to $2^5$ in the 6-digit binary number, and one of outputting the length-2×M×N Golay complementary sequence pair $[T_0, T_0^C]$ complementary sequence pair $[T_0, T_0^C]$ to output $[T_0^C, T_0]$ as $[T_1, T_1^C]$ according to the received digit value;
　　(c) receiving a Golay complementary sequence pair $[T_1, T_1^C]$ generated in the step (b), receiving a value of a digit corresponding to $2^4$ in the 6-digit binary number, and one of outputting the Golay complementary sequence pair $[T_1, T_1^C]$ as $[T_2, T_2^C]$ without order conversion and converting order of only a first sequence of the Golay complementary sequence pair $[T_1, T_1^C]$ to output $[T_2, T_2^C]$ according to the received digit value;

(d) receiving a Golay complementary sequence pair [$T_2$, $T_2^C$] generated in the step (c), receiving a value of a digit corresponding to $2^3$ in the 6-digit binary number, and one of outputting the Golay complementary sequence pair [$T_2,T_2^C$] as [$T_3,T_3^C$] without order conversion and converting order of only a second sequence of the Golay complementary sequence pair [$T_2,T_2^C$] to output [$T_3,T_3^C$] according to the received digit value;

(e) receiving a Golay complementary sequence pair [$T_3$, $T_3^C$] generated in the step (d), receiving a value of a digit corresponding to $2^2$ in the 6-digit binary number, and one of outputting the Golay complementary sequence pair [$T_3,T_3^C$] as [$T_4,T_4^C$] without sign conversion and converting a sign of only a first sequence of the Golay complementary sequence pair [$T_3,T_3^C$] to output [$-T_3,T_3^C$] as [$T_4,T_4^C$] according to the received digit value;

(f) receiving a Golay complementary sequence pair [$T_4$, $T_4^C$] generated in the step (e), receiving a value of a digit corresponding to $2^1$ in the 6-digit binary number, and one of outputting the Golay complementary sequence pair [$T_4,T_4^C$] as [$T_5,T_5^C$] without sign conversion and converting a sign of only a second sequence of the Golay complementary sequence pair [$T_4,T_4^C$] to output [$T_4,-T_4^C$] as [$T_5,T_5^C$] according to the received digit value; and (g) receiving a Golay complementary sequence pair [$T_5$, $T_5^C$] generated in the step (f), receiving a value of a digit corresponding to $2^0$ in the 6-digit binary number, and one of outputting the Golay complementary sequence pair [$T_5,T_5^C$] as [$T_6,T_6^C$] and converting a sign of odd elements of both sequences of the Golay complementary sequence pair [$T_5,T_5^C$] to, output [$T_6$, $T_6^C$] according to the received digit value.

26. The method of claim 14, wherein for A=512, a preamble sequence Pg(−200:200) is generated, wherein Pg(−200:200)={
0  1  0  1  0 −1  0 −1  0  1  0 −1
0  1  0 −1  0  1  0  1  0 −1  0 −1
0  1  0  1  0 −1  0  1  0 −1  0  1
0 −1  0 −1  0 −1  0 −1  0  1  0  1
0 −1  0  1  0 −1  0  1  0 −1  0 −1
0 −1  0 −1  0  1  0  1  0 −1  0  1
0 −1  0  1  0 −1  0 −1  0  1  0  1
0 −1  0 −1  0  1  0 −1  0  1  0 −1
0  1  0  1  0 −1  0 −1  0  1  0  1
0 −1  0  1  0 −1  0 −1  0  1  0 −1
0  1  0  1  0 −1  0  1  0 −1  0 −1
0  1  0 −1  0  1  0  1  0 −1  0  1
0 −1  0 −1  0 −1  0 −1  0  1  0  1
0 −1  0  1  0 −1  0  1  0 −1  0 −1
0  1  0  1  0 −1  0 −1  0  1  0  1
0  1  0 −1  0  1  0  1  0  1  0  1
0 −1  0 −1  0 −1  0 −1  0 −1  0  1
0 −1  0 −1  0 −1  0 −1  0  1  0 −1
0  1  0  1  0  1  0 −1  0  1  0  1
0 −1  0 −1  0  1  0  1  0  1  0  1
0  1  0 −1  0  1  0  1  0 −1  0 −1
0  1  0  1  0  1  0  1  0 −1  0 −1
0  1  0  1  0 −1  0 −1  0  1  0  1
0  1  0  1  0  1  0 −1  0  1  0  1
0 −1  0 −1  0  1  0  1  0  1  0  1
0  1  0 −1  0  1  0  1  0 −1  0 −1
0  1  0  1  0  1  0  1  0 −1  0 −1
0  1  0  1  0  1  0  1  0 −1  0 −1
0 −1  0 −1  0 −1  0  1  0 −1  0 −1
0  1  0  1  0 −1  0 −1  0 −1  0 −1
0 −1  0  1  0 −1  0 −1  0 −1  0  1
0  1  0  1  0  1  0  1  0  1  0 −1
0  1  0  1  0
} * sqrt(2) * sqrt(2) ± 1 where "−n:n" represents subcarriers of −$n^{th}$ to $n^{th}$ subcarriers.

\* \* \* \* \*